United States Patent [19]

Tomisawa et al.

[11] Patent Number: 4,694,441
[45] Date of Patent: Sep. 15, 1987

[54] POSITION CONTROL DEVICE FOR AN OPTICAL REPRODUCTION SYSTEM IN AN OPTICAL TYPE DISC REPRODUCTION DEVICE

[75] Inventors: Norio Tomisawa; Shingo Kamiya; Shinji Aoshima, all of Hamamatsu, Japan

[73] Assignee: Nippon Gakki Seizo Kabushiki Kaisha, Shizuoka, Japan

[21] Appl. No.: 660,432

[22] Filed: Oct. 11, 1984

[30] Foreign Application Priority Data

Oct. 14, 1983 [JP] Japan ................................ 57-190909
Oct. 14, 1983 [JP] Japan ................................ 57-190910

[51] Int. Cl.4 ............................................ G11B 21/10
[52] U.S. Cl. ......................................... 369/32; 369/59
[58] Field of Search .............................. 369/32, 43–45, 369/59

[56] References Cited

U.S. PATENT DOCUMENTS 3,032,266 5/1962 Couleur ................................ 235/311
3,132,245 5/1964 Harper ................................ 235/311
4,489,398 12/1984 Sugiyama et al. ..................... 369/32
4,516,164 5/1985 Moxon ............................... 369/53 X
4,546,461 10/1985 Isobe ................................ 369/59 X

FOREIGN PATENT DOCUMENTS 0117762 7/1984 Japan ..................................... 369/32

OTHER PUBLICATIONS

"A Long Play Digital Audio Disk System", Doi et al.; J. of Audio Engr. Society 1979, Dec. vol. 27, No. 12, pp. 975–987.

Primary Examiner—Aristotelis M. Psitos
Attorney, Agent, or Firm—Spensley Horn Jubas & Lubitz

[57] ABSTRACT

In picking up recorded data from a revolving optical disc by an optical reproduction system in an optical type disc reproduction device and detecting time data of Q subcode from the picked up data for performing operations such as searching a target position, the position control device according to this invention facilitates handling of data in cases such as computing time difference by converting detected present time data from a BCD code into a binary code by a BCD/binary conversion circuit and using the binary coded data. For searching a target position, time difference is detected by a time difference detection circuit on the basis of a difference between the binary coded present time data and target time data and a relative position of the optical reproduction system with respect to the optical disc is changed by a relative position change driver such that the time difference is reduced to zero.

8 Claims, 29 Drawing Figures

FIG. 4

| FIG. 4A | FIG. 4B | FIG. 4C |
|---|---|---|

FIG. 5

| FIG. 5A | FIG. 5B |
|---|---|

FIG. 9

| FIG. 9A | FIG. 9B | FIG. 9C |
|---|---|---|
| FIG. 9D | FIG. 9E | FIG. 9F |

FIG. 10

| FIG. 10A | FIG. 10B |
|---|---|

POSITION CONTROL DEVICE FOR AN OPTICAL REPRODUCTION SYSTEM IN AN OPTICAL TYPE DISC REPRODUCTION DEVICE

BACKGROUND OF THE INVENTION (a) Field of the Invention

This invention relates to a position control device for effecting a relative position change of an optical reproduction system with respect to a disc in a compact disc player of the compact disc digital audio system and, more particularly, to a position control device effecting such relative position change of the optical reproduction system on the basis of a Q subcode containing time information in the data format of the compact disc digital audio system.

(b) Description of the Prior Art

As shown in FIG. 1(a), the data format of the compact disc digital audio system is such that one (1) frame consists of 588 channel bits including a one-symbol (eight bits) subcode area. The subcode, completed using 98 data frames, is constituted of eight 98-bit channels P, Q, . . . , W, as shown in FIG. 1(b). The subcode in the channel Q (Q subcode) is composed as shown in FIG. 1(c). signal in the Q subcode has three modes 1, 2, and 3. The mode is determined by a preceding address signal.

The Q subcode in the mode 1 is time data in which are recorded the time which has elapsed from the beginning of playing of a certain music piece in the disc (referred to as "piece time" below) and the time which has elapsed from the beginning of playing of the first piece in the disc (referred to as "accumulated time" below). This time data is represented in the BCD code in respect of minutes, seconds and frames each consisting of 2 digits (since 1 digit is expressed by 4 bits, time data consists of 6 digits×4 bits=24 bits). The term "frame" in the time data represents a unit under one second (For distinguishing this "frame" representing a unit of time from the above mentioned "frame" representing a section of 588 channel bits, the "frame" representing a section of 588 channel bits will be referred to as "data frame" in the following description). Since 75 subcodes are obtained per second (transmission rate 4.3218 M bits/S÷588 bits÷98 frames =75), frames are represented by quinary septuagesimal representation, i.e., 75 frames constitute 1 second. Time data of Q subcode is displayed directly for indicating the reproduced position and also is used for detecting difference from a target address and thereby moving the optical system in a search operation such as random access. In the search operation, if time data of Q subcode can be always detected without fail, time difference data between present time and target time is always available and can be given as a speed command for the drive system and the control can be performed such that the time difference will be reduced to zero.

In the actual search operation, however, data is picked up from the disc while the optical head is being displaced with a result that failure in reading the time data of Q subcode sometimes takes place. In the case of such failure, control is performed holding the Q subcode which has been read in the preceding time. Since time difference is used as a speed command as described above, the optical head keeps on moving at the same speed with a result that it tends to go past the target position and cannot reach it smoothly.

SUMMARY OF THE INVENTION

It is an object of the present invention to facilitate handling of data and simplify the construction of the device by converting the time data of the Q subcode into data of a binary code.

It is another object of the invention to provide a position control device for an optical reproduction system in an optical type disc reproduction device capable of detecting a target address precisely and smoothly even if time data of Q subcode cannot be read for a relatively long period of time.

According to the invention, there is provided a position control device for an optical reproduction system in an optical type disc reproduction device comprising a disc rotating driver for rotating an optical disc on which information is recorded, an optical reproduction system picking up the recorded data optically from the rotating optical disc, a BCD/binary conversion circuit for converting time data of a Q subcode contained in the data picked up by the optical reproduction system from a BCD code into a binary code, and relative position change driver for changing a relative position of the optical reproduction system with respect to the optical disc in accordance with the time data of the Q subcode which has been converted into the binary code.

BRIEF DESCRIPTION OF THE DRAWINGS

In the accompanying drawings:

FIG. 5 which is split into

FIG. 9 which is split into FIG. 10 which is split into

DESCRIPTION OF PREFERRED EMBODIMENT

Embodiments of the invention will be described below with reference to the accompanying drawings.

Figure 1:
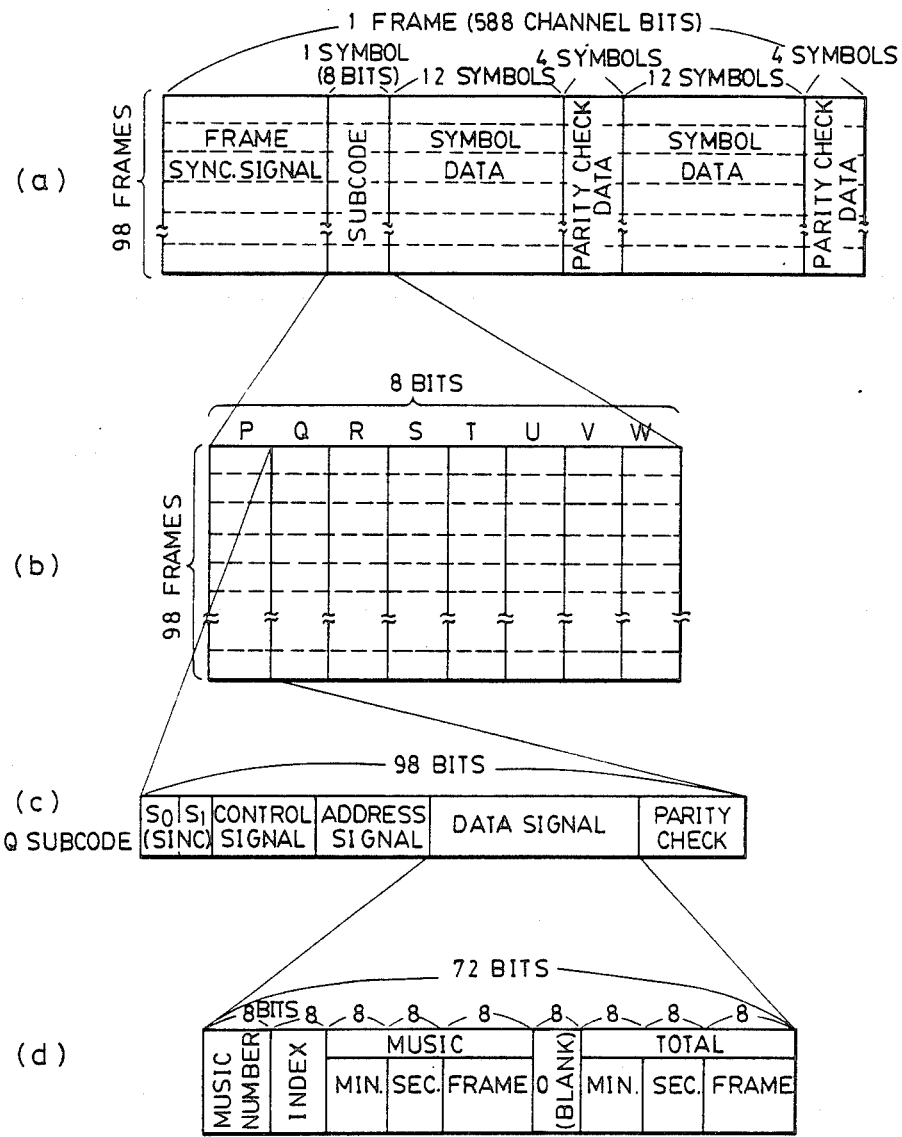
FIG. 1, consisting of (a)-(d), is a diagram showing a data format of the compact disc digital audio system.
Figure 2:
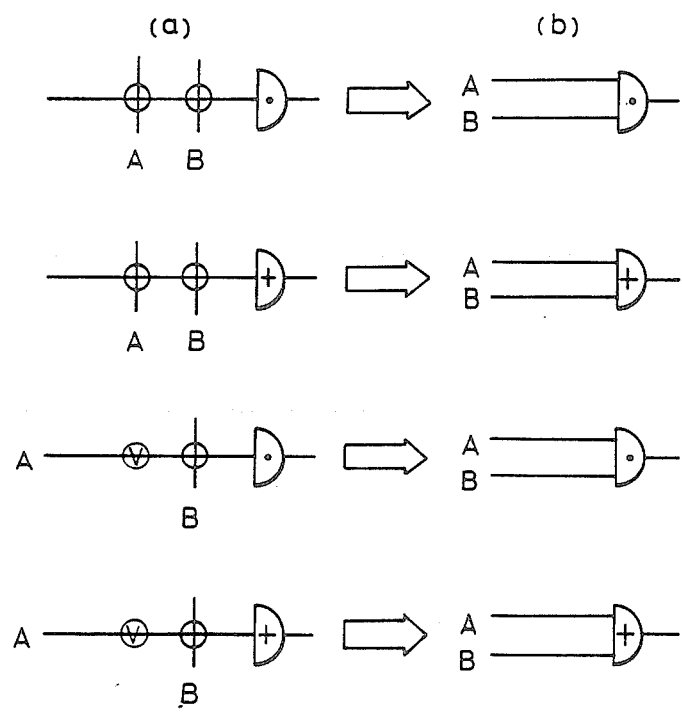
FIG. 2, consisting of (a) and (b) is a diagram for explaining manners of illustrating the logical circuit in the drawings in the present application.

Note that for the sake of simplicity, the logical circuits are designated using simplified signs in the drawings. Examples of such simplified signs of logical circuits are shown in FIG. 2(b). FIG. 2(a) shows the corresponding signs as generally used.

Figure 3:
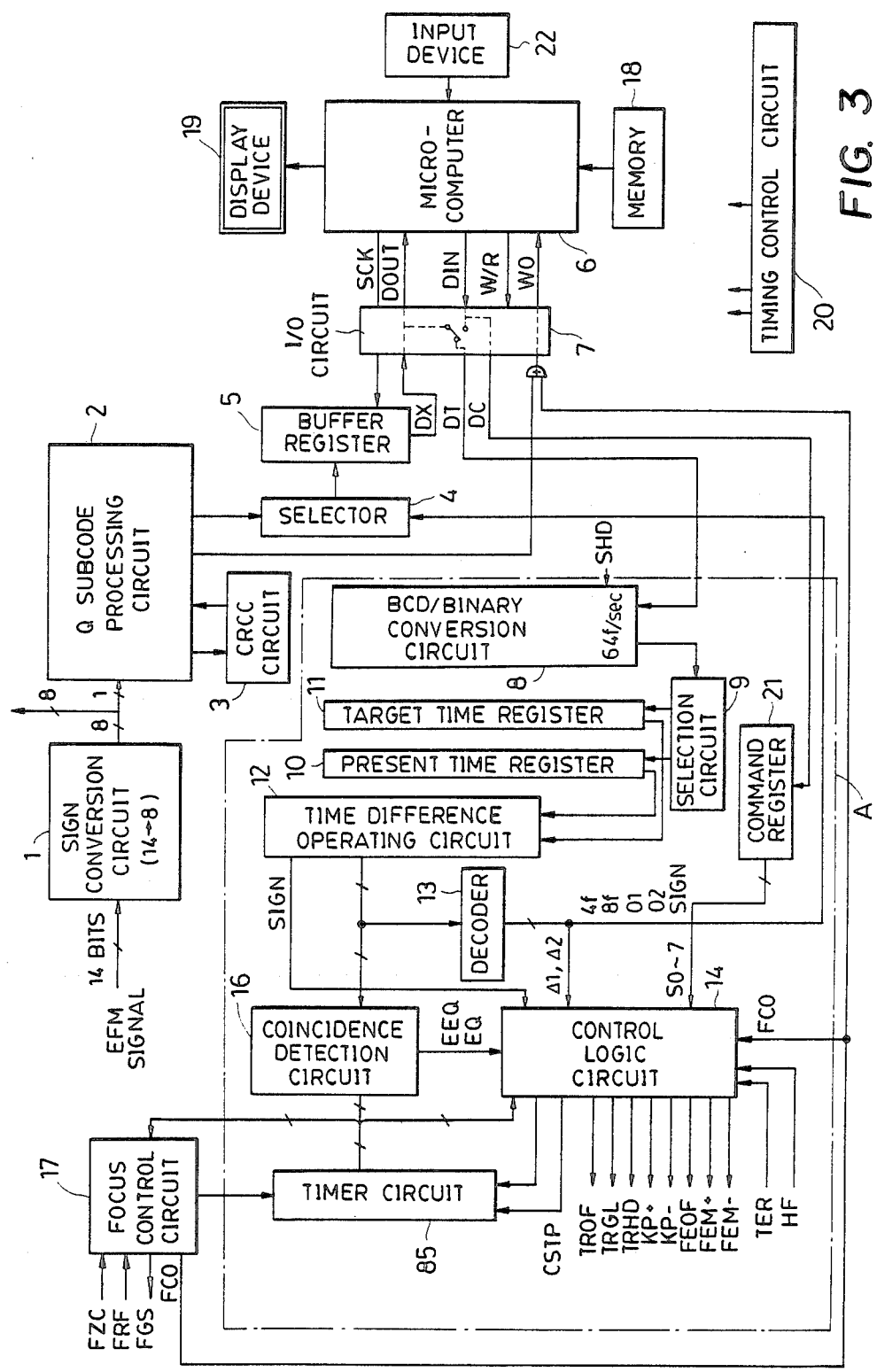
FIG. 3 is a block diagram showing an embodiment of the position control device according to the invention.

Referring to FIG. 3 showing an embodiment of the position control device according to the invention, the EFM eight to fourteen modulation) signal reproduced from the disc is converted into the original 8-bit signal by a sign conversion circuit 1. The Q subcode signal of which one bit is contained in each data frame of said converted signal is written into a Q subcode processing circuit 2 sequentially, thus completing one (1) Q subcode in every 98 data frames. This Q subcode is checked for error by a CRCC (cyclic redundancy check code) circuit 3 and, when found free of error, provided from the Q subcode processing circuit 2 and applied to a selector 4.

The selector 4 selects and outputs the Q subcode and data of time difference between the present time and a target time obtained by decoding the output of a time difference operating circuit 12 to be described later. The time difference data is produced at a timing immediately preceding that at which the Q subcode is produced, and applied to a buffer register 5. The buffer register 5, comprising eight bits, once stores therein the output of the selector 4 (parallel signal) to supply it to a microcomputer 6 through the Dout output of an I/O (input/output) circuit 7 as a serial signal DX according to a shift signal SCK supplied from the microcomputer 6. The Q subcode, i.e., time data indicating the present address, among the output of the selector 4, is supplied through the DX output of the buffer register 5 and the DT output of the I/O circuit 7 to a BCD/binary conversion circuit 8, whereby it is selectively shifted in response to a shift signal SHD and written into a register in a BCD/binary conversion circuit 8 sequentially.

Also, the time data in the target address produced from an input device 22 is supplied through the Din output of the microcomputer 6 and the DT output of the I/O circuit 7 to the BCD/binary conversion circuit 8 and stored sequentially in the register in the circuit 8 in response to the shift signal SHD. Further, the BCD/binary conversion circuit 8 converts these time data represented in BCD code in respect of minutes, seconds and frames into a series of binary code. The time data converted into the binary code is produced from the BCD/binary conversion circuit 8 and distributed by a selection circuit 9 such that the time data in the present address is supplied to a present time register 10 while the time data in the target address is supplied to a target time register 11, and stored in the respective registers.

The time difference operating circuit 12 produces data of the time difference between the present time and the target time (a combination of the absolute value of the time difference and the sign data SIGN indicating its sign of plus or minus). The time difference data is decoded by a decoder 13 and used for the feed control and tracking control in the search mode (retrieval operation such as random access) and a pause mode (operation of holding data in the present address; in this embodiment, the pause mode is treated as a kind of search mode where the present time is the target time). The time difference data is decoded by a decoder 13 and applied to the microcomputer 6 through the selector 4 and used to switch the control mode by detecting arrival at a target position.

A command register 21 is provided to hold and apply to a control logic circuit 14 command data $S_0$ to $S_7$ (command on operations such as play and search) supplied from the microcomputer 6. The control logic circuit 14 is provided to produce various control signals for tracking control and feed control according to the command data $S_0$ to $S_7$. Where the command is of the 7 mode (search mode), the control is effected by classifying the mode into further four submodes according to the time difference data. A timer circuit 85 provides output timings of the control signals produced from said control logic circuit 14. A coincidence detection circuit 16 is provided to effect control of approach to the target position upon partial coincidence between the signals from the timer 85 and the time difference operating circuit 12 in the search mode $S_7$, as will be described later.

A focus control circuit 17 is provided to effect a light beam focus control by producing and supplying a focus-out signal FCO to the control logic circuit 14 so that the tracking control and feed control may be once disabled to relocate the focus. More specifically, when the light beam is out of focus, a focus actuator is once returned to its initial position according to an initial setting signal FCS and moved gradually from said initial position until, upon detecting that the reflecting light is being received by a 4-split photodiode, i.e., that the photo actuator has approached the focus (detection signal FRF) and the signal indicating the difference between the two diagonal outputs of the 4-split photodiode has zero-crossed (detection signal FZC), the light beam is judged to be in focus and the focus-out signal FCO is cleared thereby resuming the tracking control and feed control. At this time, the time which elapsed from when the focus actuator was started to be moved is monitored in the timer 85 and, in case the light beam failed to be in focus within a given time, the focusing operation is judged to have been a failure and is started over from the beginning.

In FIG. 3, the input device 22 is provided to perform operations such as playback, fast feed, feed return, and pause as well as setting of the number or numbers of pieces of the program for retrieval operation such as random access. A memory 18 stores the set piece numbers, etc. A display device 19 indicates the present time of the read out Q subcode, etc. A timing control circuit 20 produces timing signs used in various parts of the circuit mentioned above.

Figure 4A:
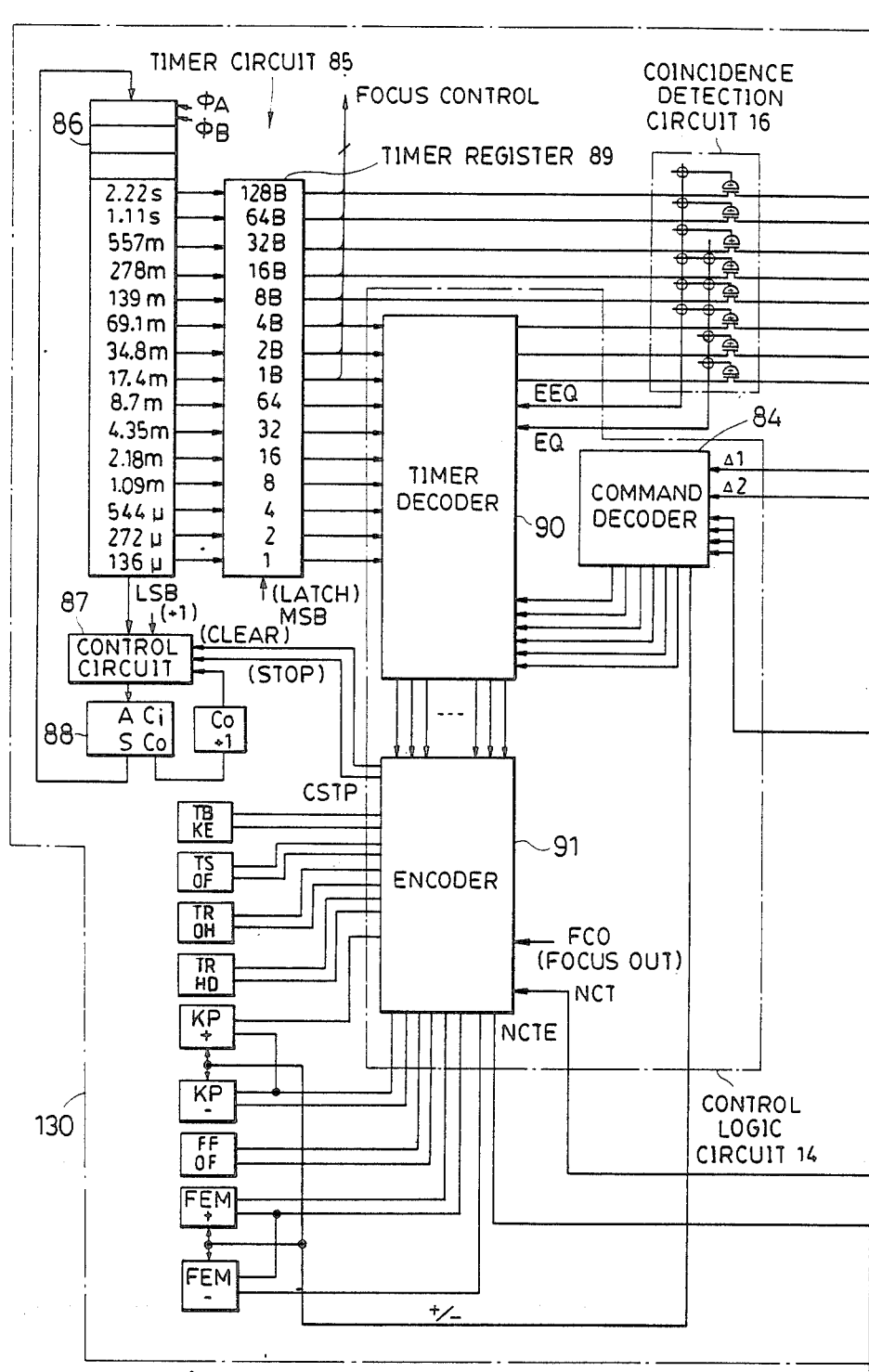
FIG. 4 which is split into FIGS. 4A, 4B and 4C for convenience of illustration is a block diagram showing a specific example of a portion designated by a reference character A in FIG. 3.
Figure 4B:
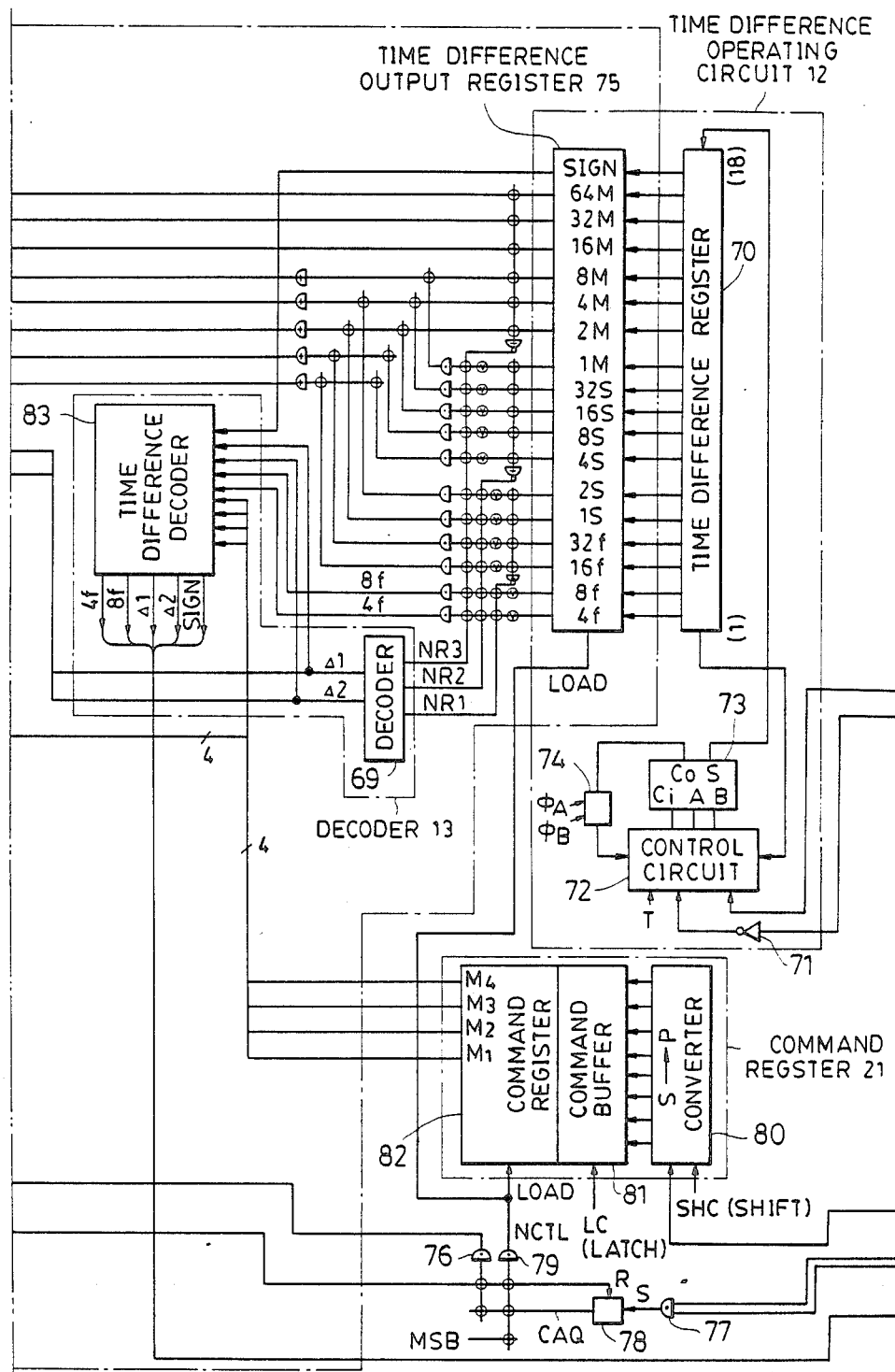
Figure 4C:
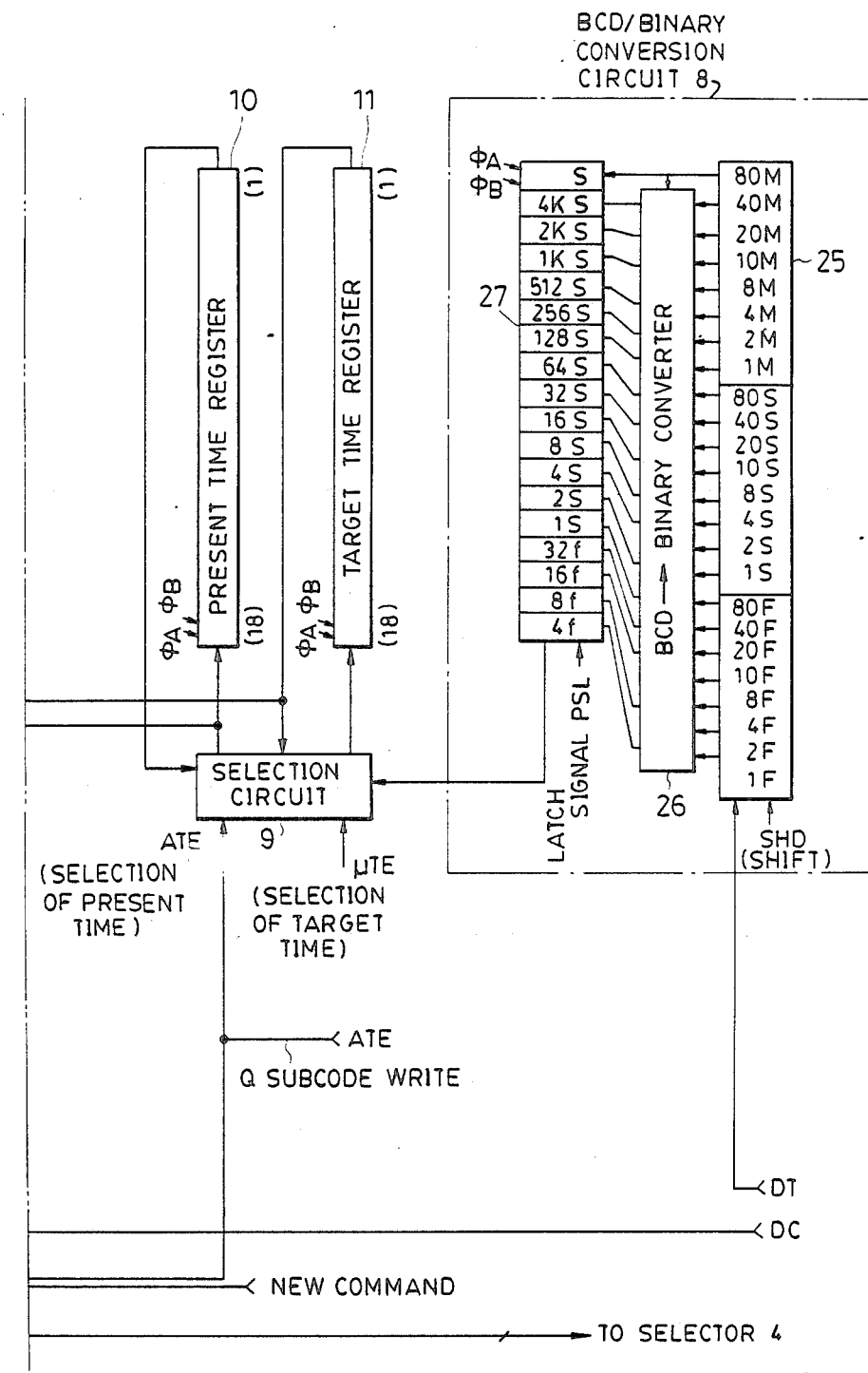

FIG. 4 shows in more detail the part of the embodiment illustrated in FIG. 3 surrounded by a chain-and-dot line A. In FIG. 4, the BCD/binary conversion circuit 8 is provided to convert the representation of the time data (present time or target time) consisting of BCD code for minutes, seconds and frames into a series of binary code. The circuit 8 comprises a 24-bit BCD register 25 for converting serial data into parallel data, a BCD/binary converter 26 for converting the BCD code of the time data held in the BCD register 25 into binary code, and a parallel-to-serial converter 27 for holding the binary coded data to convert it from parallel data into serial data before delivering out the data. In the BCD register 25, the BCD code is first converted into binary codes each representing minutes, seconds and frames, whereon a series of binary codes are obtained by combining these codes. In this case, since the frames are originally represented in quinary septuagesimal representation and 75 frames corresponding to one (1) second is represented in such odd number as 1001001 in binary, obtaining a series of binary codes using the frames represented in quinary septuagesimal representation involves a troublesome conversion of the respective binary codes representing seconds and minutes based on said odd number. Therefore, in this embodiment, the representation of the frame itself is converted from the quinary. septuagesimal representation into the quaternary sexagesimal representation so that the binary code representing seconds may be used without being converted in conformity with frames. Where frames are represented in quaternary sexagesimal, since 64 frames (the frame will be described with "f" for distinction hereinafter) corresponding to one second are represented as 1000000 in binary, a series of binary codes representing seconds and frames can be obtained by combining the binary code representing seconds unaltered to the higher side of said binary code representing frames including the most significant bit. The binary code representing minutes is multiplied by 60 so as to be represented in seconds and added to the binary code representing seconds. Thus, a series of binary codes representing the time data in respect of minutes, seconds and frames is obtained.

Figure 5A:
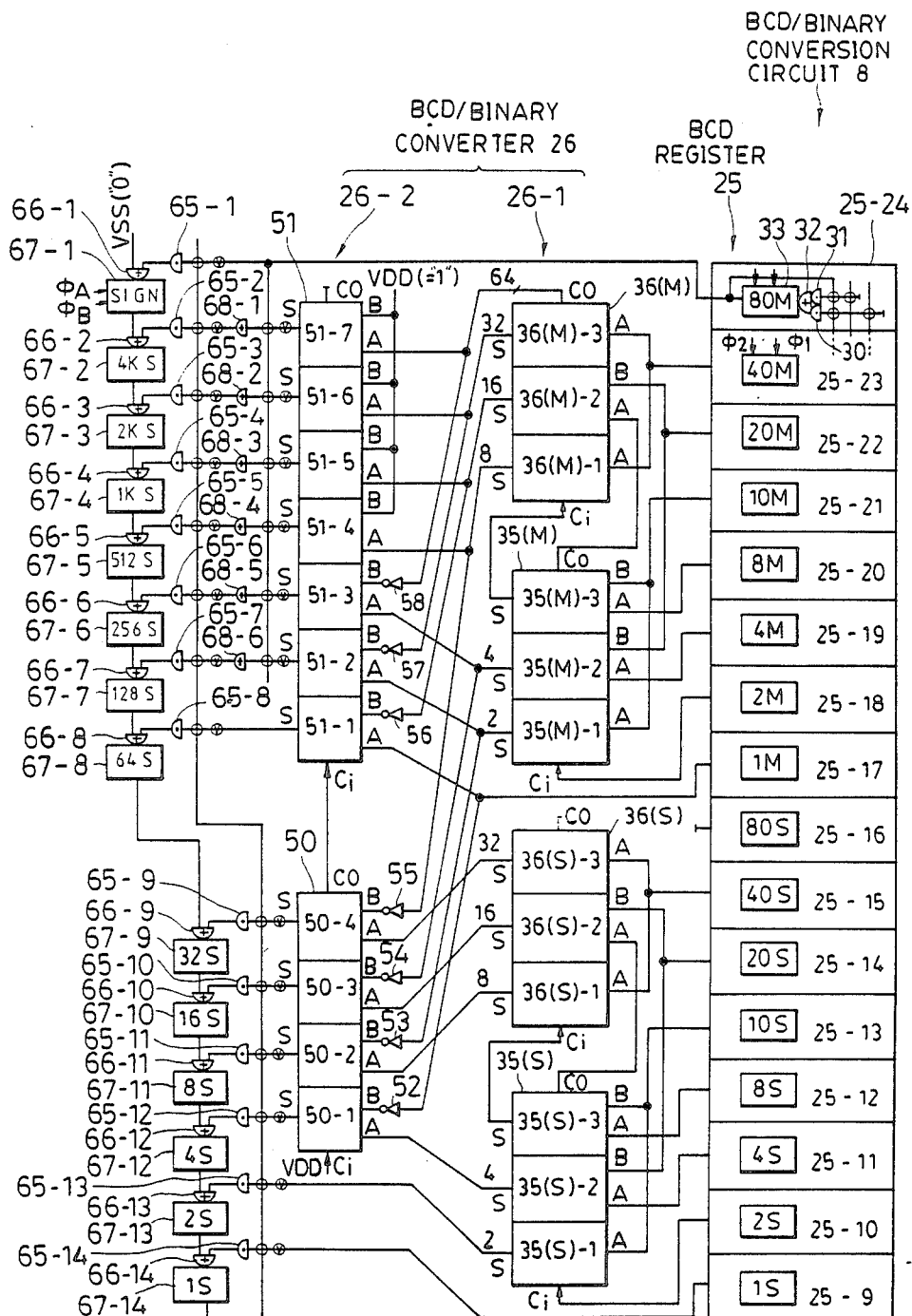
FIGS. 5A and 5B is a circuit diagram showing a specific example of BCD/binary conversion circuit 8 in FIG. 4.
Figure 5B:
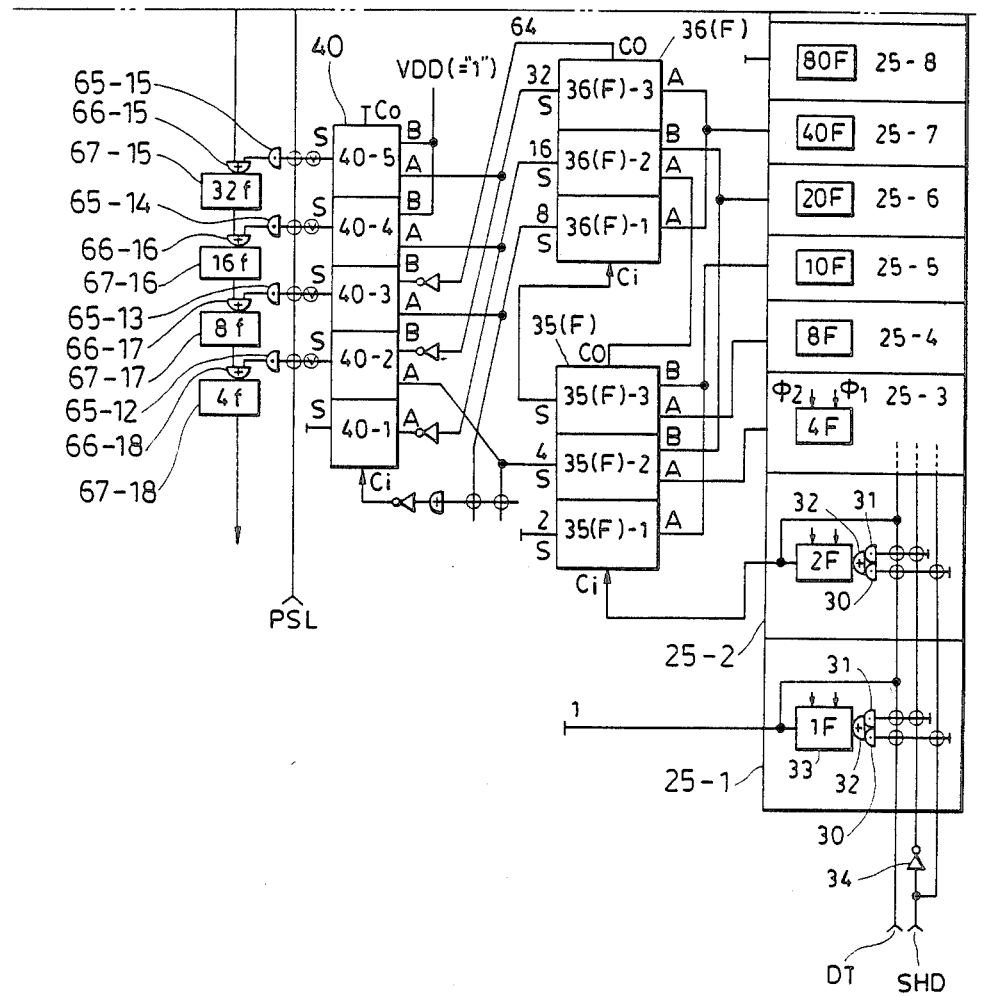

FIG. 5 shows a specific example of the BCD/binary conversion circuit 8 constituted on the basis of this concept. In FIG. 5, the BCD register 25 holds the BCD code represented in minutes, seconds and frames. The BCD/binary converter 26 comprises a full-adder section 26-1 for converting this BCD code to binary code in respect of minutes, seconds and frames, separately and a full-adder section 26-2 for converting these separate binary codes to a series of binary codes. These full-adder sections will be described below, respectively.

(1) BCD Register

The BCD register 25 consists of 24 bits (25-1 to 25-24) divided into six 4-bit portions, each for one digit, those portions being respectively assigned to the unit digit of the frame (25-1 to 25-4), the tenth digit of the frame (25-5 to 25-8), the unit digit of the second (25-9 to 25-12), the tenth digit of the second (25-13 to 25-16), the unit digit of the minute (25-17 to 25-20), and the tenth digit of the minute. Each bit is provided with two AND gates 30, 31, an OR gate 32 supplied with the outputs of the AND gates 30, 31, and a register 33 in which is stored the output of the OR gate 32 at the timings of clocks $\phi1$, $\phi2$ (a 294-th of one data frame (136 $\mu$s), i.e., 2.162 MHz). The AND gates 30 of the respective bits are supplied with a shift signal SHD (bit time signal) in common. The AND gates 31 are supplied with the inverse of the shift signal SHD from an inverter 34. The AND gate 30 in the first stage 25-1 is supplied with time data in BCD code sequentially, the most significant bit first. The output of the register 33 in each bit is applied to the AND gate 30 in the next bit. Accordingly, the time data applied to the first stage 25-1 is shifted to the more significant bits sequentially according to the shift signal SHD until the BCD code representing one time data is stored in the BCD register 25 through 24 shifts.

(2) Full-adder section 26-1

The representation of the data stored in the BCD register 25 is converted to a binary code by full-adders 35 (M,S,F), 36 (M,S,F) provided in respect of minutes, seconds and frames. Specifically, the outputs of the first bits 25-1, 25-9, 25-17 being the unit digit of the minutes, seconds and frames in the BCD register 25 are taken out directly without being passed through the full-adders 35, 36, the outputs of the second bits 25-2, 25-10, 25-18 are supplied to the carry input of the first stage 35-1 of the full-adder 35, the third bits 25-3, 25-11, 25-19 are applied to the second stage 35-2 of the full-adder 35 and the fourth bits 25-4, 25-12, 25-20 are supplied to the third stage 35-3 of the full-adder 35. The output of the third stage 35-3 of the full-adder 35 is applied to the carry input of the first stage 36-1 of the full-adder 36 and the carry output of the full-adder 35 is applied to the second stage 36-2 of the full-adder 36. The outputs of the first bits 25-5, 25-13, 25-21 being the tenth digit of the minutes, seconds and frames in the BCD register 25 are applied to the first stage 35-1 and the third stage 35-3 of the full-adder 35, the outputs of the second bits 25-6, 25-14, 25-22 are supplied to the second stage 35-2 of the full-adder 35 and the second stage 36-2 of the full-adder 36, and the outputs of the third bits 25-7, 25-15, 25-23 are applied to the first stage 36-1 and the third stage 36-3 of the full-adder 36. The outputs of the fourth bits 25-8, 25-16, 25-24 correspond to 80 in decimal and is not applicable to any case. (None of the minutes, seconds and frames reaches 80 because the maximum recording time of a compact disc is about 74 minutes while the seconds are expressed in sexagesimal and the frame in quinary septuagesimal. The fourth bits are therefore not used.) The most significant bit 25−24 is used as the sign bit (to indicate +, −) as will be described later. The above structure enables binary-coded time data representing minutes, seconds and frames, separately, to be obtained of which the least significant bits are the outputs of the first bits 25-1, 25-9, 25-17 or the unit digits in the BCD register 25, the second bits are the outputs of the first stages 35-1 of the respective full-adders 35, the third bits are the outputs of the second stages 35-2 of the respective full-adders 35, the fourth bits are the first stages 36-1 of the respective full-adders 36, the fifth bits are the outputs of the second stages 36-2 of the respective full-adders 36, and the most significant bits are the carry outputs of the third stages 36-3 of the respective full-adders 36.

(3) Full-adder section 26-2

The time data in binary code separately representing minutes, seconds and frames is then converted to data represented in a continuous binary code. Since the frame section is represented in quinary septuagesimal, using it as such is inconvenient as the seconds must be converted accordingly. Therefore, the numeral system in which to represent frames is converted from the quinary septuagesimal representation to the quaternary sexagesimal representation so that the binary code of the seconds may be used unaltered. The binary code of the minute is multiplied by 60 so as to be expressed in seconds.

A full-adder 40 performs the operation of converting the notation in which the frame is represented from the quinary septuagesimal system to the sexagesimal system. The full-adder 40 consists of five bits 40-1 to 40-5 of which the decimal outputs correspond respectively to 2f, 4f, 8f, 16f, and 32f. The bit output corresponding to decimal 4 of the frame data of which the representation was converted to binary code by the full-adders 35(F), 36(F) (i.e., the output of the second stage 35(F)-2 of the full-adder 35(F)) is applied to the second stage 40-2 of the full-adder 40 and the bit output corresponding to 8 (the output of the first stage 36(F)-1 of the full-adder 36(F)) is applied to the third stage 40-3 of the full-adder 40. The bit output corresponding to 16 (the output of the second stage 36(F)-2 of the full-adder 36(F)) is applied to the fourth stage 40-4 of the full-adder 40 as well as its first stage 40-1 through an inverter 43, the bit output corresponding to 32 (the output of the third stage 36(F)-3 of the full-adder 36) is applied to the fifth stage 40-5 of the full-adder 40 as well as its second stage 40-2 through an inverter 44, and the bit output corresponding to 64 (the carry output of the third stage 36(F)-3 of the full-adder 36(F)) is applied to the third stage 40-3 of the full-adder 40 through an inverter 45. The bit outputs corresponding to 4 and 8 (the outputs of 35(F)-2, 36(F)-1) are applied to the first stage carry input of the full-adder 40 through an OR gate 41 and the inverter 42. The fourth stage 40-4 and the fifth stage 40-5 of the full-adder are supplied with VDD="1".

The above arrangement enables binary-coded data to be obtained from the full-adder 40 with the notation converted from the quinary septuagesimal system in which the data was applied to the full-adder 40 to the quaternary sexagesimal system. Of the outputs of the full-adder 40, the most significant four bits (40-5 to 40-2) are used. The relation between the representations of frames before and after the conversion is shown in Table 1.

TABLE 1

| frame before conversion decimal notation (binary code) | frame (f) after conversion decimal notation (binary code) | frame before conversion | frame (f) after conversion |
| --- | --- | --- | --- |
| 0~7 (0000000) (0000111) | 0(0000XX) | 40~43 | 32(1000XX) |
| 8~11 | 4(0001XX) | 44~47 | 36(1001XX) |
| 12~15 | 8(0010XX) | 48~51 | 40(1010XX) |
| 16~19 | 12(0011XX) | 52~55 | 44(1011XX) |
| 20~23 | 16(0100XX) | 56~59 | 48(1100XX) |
| 24~27 | 20(0101XX) | 60~63 | 52(1101XX) |
| 28~31 | 24(0110XX) | 64~71 | 56(1110XX) |
| 32~39 | 28(0111XX) | 72~75 | 60(1111XX) |

The 4-bit output after the conversion is represented in the quaternary sexagesimal system with 1s in the respective bits corresponding to decimal 32, 16, 8, 4 in the order of significance.

The binary data representing seconds produced from the full-adders 35(S), 36(S) are used unaltered without conversion. The binary data representing minutes produced from the full-adders 35(M), 36(M) are multiplied by 60 using full-adders 50, 51 so as to represent seconds. More specifically, 1s in the respective bits 50-1 to 50-4 of the full-adder 50 correspond to 4, 8, 16, 32 and 1s in the respective bits 51-1 to 51-7 of the full-adder 51 correspond to 64, 128, 256, 512, 1024, 2048, 4096. Since 1 minute=60 seconds=64 seconds-4 seconds, the first bit of the binary-coded data (the output of the stage 25-17 of the BCD register 25) of which 1 represents one minute is supplied to the first bit 51-1 of the full-adder 51 corresponding to 64 seconds and, through an inverter 52, to the first bit 50-1 of the full-adder 50 corresponding to 4 seconds. Since 2 minutes=120 seconds=128 seconds-8 seconds, the second bit of the binary-coded data (the output of the first bit 35(M)-1 of the full-adder 35) of which 1 represents two minutes is supplied to the second stage 51-2 of the full-adder 51 corresponding to 128 seconds and, through an inverter 53, to the second stage 50-2 of the full-adder 50 corresponding to eight seconds. Since 4 minutes=240 seconds=256 seconds-16 seconds, the third bit of the binary-coded data (the output of the second bit 35(M)-2 of the full-adder 35(M)) of which 1 represents four minutes is supplied to the third stage 51-3 of the full-adder 51 corresponding to 256 seconds and, through an inverter 54, to the third stage 50-3 of the full-adder 50 corresponding to 16 seconds. Since 8 minutes=480 seconds=512 seconds-32 seconds, the fourth bit of the binary-coded data (the output of the first stage 36(M)-1 of the full-adder 36(M)) of which 1 represents eight minutes is supplied to the fourth bit 51-4 of the full-adder 51 corresponding to 512 seconds and, through an inverter 55, to the fourth stage 50-4 of the full-adder 50 corresponding to 32 seconds. Since 16 minutes=960 seconds=1024 seconds-64 seconds, the fifth bit of the binary-coded data (the output of the second bit 36(M)-2 of the full-adder 36(M)) of which 1 represents 16 minutes is supplied to the fifth stage 51-5 of the full-adder 51 corresponding to 1024 seconds and, through an inverter 56, to the first bit 51-1 of the full-adder 51 corresponding to 64 seconds. Since 32 minutes=1920 seconds=2048 seconds-128 seconds, the fifth bit of the binary-coded data (the output of the third bit 36(M)-3 of the full-adder 36(M)) of which 1 represents 32 minutes is supplied to the sixth bit 51-6 of the full-adder 51 corresponding to 2048 seconds and, through an inverter 58, to the second bit 51-2 of the full-adder 51 corresponding to 128 seconds. Since 64 minutes=3840 seconds=4096 seconds-256 seconds, the seventh bit of the binary-coded data (the carry output of the third bit 36(M)-3 of the full-adder 36(M)) of which 1 represents 64 minutes is supplied to the seventh bit 51-7 of the full-adder 51 corresponding to 4096 seconds and, through an inverter 58, to the third bit 51-3 of the full-adder 51 corresponding to 256 seconds. The fourth to seventh bits 51-4 to 51-7 of the full-adder 51 are each provided with "1" at all times.

Thus, the binary code representing minutes is converted to binary code representing seconds to obtain time data expressed in a series of binary codes where minutes, seconds and frames (f) are combined, in which the signals of the respective bits 51-7, 51-6, . . . , 51-1, 50-4, 50-3, . . . , 50-1, 35(S)-1, 25-9, 40-5, 40-4, . . . , 40-1 are arranged in the order of significance. The signals of these bits are latched in registers 67-2 to 67-18 through AND gates 65-2 to 65-18 and OR gates 66-2 to 66-18 according to a latch signal PSL (this latch signal is produced when the microcomputer 6 detects that one time data has been stored in the BCD register 25).

Registers 67-1 to 67-18, constituting the parallel-to-serial converter 27, sequentially deliver the latched data as serial data according to clocks φA, φB (an 18th of one data frame 136 μs)).

The most significant bit 25-24 of the BCD register 25 is a sign bit, "1" in it indicating the minus sign of the time data. Though minus time data does not in fact exist, this is used to locate the beginning of the first piece. More specifically, upon the command to locate the first piece, the signal "1" from the microcomputer 6 is compulsorily stored in the most significant bit 25-24. In response to this signal "1", the sign bit "1" is latched in the register 67-1 through the AND gate 65-1 and the OR gate 66-1 (VSS supplied to the other input of this OR gate 66-1 is "0" all the time). At the same time, "1" is latched in the registers 67-2 to 67-7, respectively, through OR gates 68-1 to 68-6, thereby setting an imaginary present time −128 seconds. Also, at this time, a target time 0 (i.e., the time of the beginning of the first piece) is produced from the microcomputer 6 for the time difference operating circuit 12 to perform the operation:

the target time−the present time =0−(−128 seconds)=128 seconds to effect a control whereby the time difference 128 seconds is reduced to 0, thus locating the beginning of the first piece of the program.

(Din−DT). The code of each command and its contents are shown in Table 2.

TABLE 2

| mode name of command | | contents of command | code | | | | | | | |
|---|---|---|---|---|---|---|---|---|---|---|
| | | | M4 | M3 | M2 | M1 | T4 | T3 | T2 | T1 |
| 0 | | STOP | 0 | 0 | 0 | X | used for test and not for command | | | |
| 1 | 1-0 | FEED FORWARD | 0 | 0 | 1 | 0 | | | | |
| | 1-½ | FEED RETURN | 0 | 0 | 1 | 1 | | | | |
| 2 | | FOCUS START | 0 | 1 | 0 | X | | | | |
| 3 | 3-0 | DISC START | 0 | 1 | 1 | 0 | | | | |
| | 3-½ | DISC BRAKE | 0 | 1 | 1 | 1 | | | | |
| 4 | 4-0 | PLAY | 1 | 0 | 0 | 0 | | | | |
| | 4-½ | PLAY MUTE | 1 | 0 | 0 | 1 | | | | |
| 5 | 5-0 | + | 1 | 0 | 1 | 0 | | | | |
| | 5-½ | − | 1 | 0 | 1 | 1 | | | | |
| 6 | 6-0· | + | 1 | 1 | 0 | 0 | | | | |
| | 6-½ | − | 1 | 1 | 0 | 1 | | | | |
| 7 | | PAUSE, SEARCH | 1 | 1 | 1 | X | | | | |

("X" = "0")

Referring to FIG. 4, the 18-bit binary-coded time data produced from the BCD/binary conversion circuit 8 is applied to the selection circuit 9 from which, according to selection signals ATE (for selection of the present time) and μTE (for selection of the target time), the present time data is stored in the present time register 10 while the target time data is stored in the target time register 11 according to the clocks φA, φB at a timing of an 18th of one data frame. The target time data, once stored, remains held until cleared whereas the present time data is rewritten each time the time data in the Q subcode is read. The present time register 10 and the target time register 11 both consist of 18 bits through which data is shifted according to the clocks φA, φB, so that one time data is stored taking one data frame (136 μs).

The present time data and the target time data planted in the present time register 10 and the target time register 11, respectively, are serially produced according to clocks φA, φB, the least significant bit first and sequentially, and applied to the time difference operating circuit 12. The present time data is inverted by an inverter 71 to obtain its complement in order to calculate the time difference. These present time data and target time data are applied through a control circuit 72 to the A and B inputs of an adder 73 respectively, which performs serial addition at the timing of a signal T. The carry output Co of the adder 73 is delayed one bit by a register 74 while, from the output S of the adder 73, the time difference data of "the target time−the present time" is produced sequentially and stored in the 18-bit shift register 70 sequentially. Each time the Q subcode data is reproduced (every 98 data frames (about 13.3 ms) if read each time), the time difference data is produced and the contents of the time difference register 70 renewed.

The signals of the respective bits of the time difference register 70 are applied to a time difference output register 75 consisting of an 18-bit register and transferred thereto according to a load signal NCTL to be described later.

Figure 6:
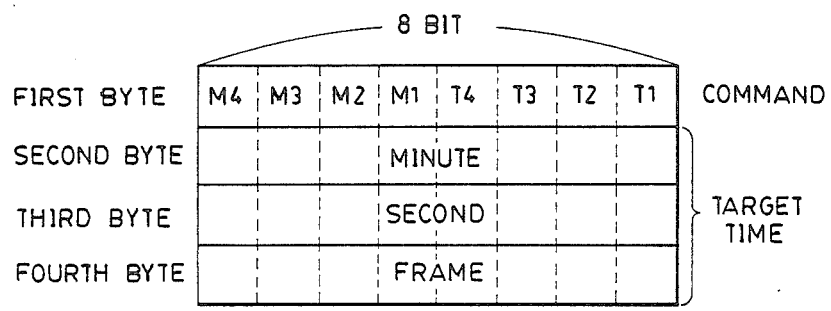
FIG. 6 is a diagram showing a data format produced from Din output of a microcomputer 6.

As shown in FIG. 6, the Din output of the microcomputer 6 consists each of eight bits in which the command (operation command) is produced (Din−DC) in the first byte prior to the delivery of the target time The commands having command names with ½ at the end possess the inverse contents in relation to the commands having command names without ½. Each command consists of eight bits M4, ..., M1, T4, ..., T1 of which the least significant four bits T4, ..., T1 are only used for test and the command is virtually specified by the most significant four bits M4, ..., M1. The bit M1 is used to distinguish between the mode names with ½ at the end and those without it such that the bit M1 is "1" to indicate the former and "0" to indicate the latter. In such modes as the 0 mode, 2 mode, 7 mode, where there is no distinction between 0 and ½, the bit M1 may be either "X" i.e., "0" as in this example or "1". The meaning of each command will be described below.

(a) 0 mode (STOP):
A command to stop all the operations.

(b) 1-0 mode (FEED FORWARD):
A command to move the optical head toward the outer tracks of the disc.

(c) 1-½ mode (FEED RETURN):
A command to return the optical head to the end portion at the innermost tracks of the disc when, for example, ending the playback.

(d) 3-0 mode (DISC START):
A command to brake the motor rotating the disc (to apply the inverse voltage).

(e) 4-0 mode (PLAY):
A play command.

(f) 4-½ (PLAY MUTE):
A command to mute the reproduction signal, given, for example, at the time of PAUSE.

(g) 5-0 mode (▷ ▷ +):
A command to feed fast.

(h) 5-−½ mode (▷ ▷ −):
A command to return.

(i) 6-0 mode (▷▷▷+):
A command to feed at a high speed (when the 5-0 mode operation has been performed for two seconds, for example, the operation automatically shifts to the 6-0 mode).

(j) 6-½ mode (▷▷▷−):
A command to return at a high speed (when the 5-½ mode operation has been performed for two seconds, for example, the operation automatically shifts to the 6-½ mode).

(k) 7 mode (PAUSE, SEARCH):

A pause command (to remain in the present play address), a command to retrieve the target address. The pause mode is treated as the search mode in which the present play address is the target address.

The command delivered from the microcomputer 6 is applied to a serial-to-parallel converter (shift register) 80 and stored therein as it is shifted according to the shift signal SHC. Synchronizing with the termination of storage of eight bits, these eight bits are stored in a command buffer 81 according to a latch signal LC. The command buffer 81 holds and transfers the command to a command register 82 so that the command register 82, if supplied with the load signal NCTL for other than a new command, may not be reset. The command stored in the command buffer 81 is transferred to the command register 21 according to the same signal as the load signal supplied to said time difference output register 75.

In FIG. 4, the decoder 69 divides the time difference into four sections, detects to which of these sections the time difference stored in the time difference output register 75 belongs and produces the detection signal as a 2-bit signal Δ1, Δ2. A time difference decoder 83 is used to deliver the time difference data to the microcomputer 6 in the 7 mode (SEARCH mode, PAUSE mode) to switch the operation mode after arrival at the target position. More specifically, decoding the time difference data stored in the time difference output register 75, the decoder 83 delivers the decoded time difference data to the microcomputer 6 when the output of the command register 21 commands the 7 mode. A command decoder 84 decodes the command produced from the command register 21. In the 7 mode, the decoder 84 produces the command in eight varieties according to the time difference data Δ1, Δ2 produced from the decoder 69 and the signs +, −, as shown in Table 3.

TABLE 3

| Command Name of the 7 mode | Sign of the time difference | Absolute value of the time difference |
|---|---|---|
| 7-0 | + | less than 16f |
| 7-4 | − | |
| 7-1 | + | not less than 16f and less than 4 seconds |
| 7-5 | − | |
| 7-2 | + | not less than 4 seconds and less than 2 minutes |
| 7-6 | − | |
| 7-3 | + | not less than 2 minutes |
| 7-7 | − | |

A timer 85 prepares standard time for preparing various control signals in the feed control and tracking control. The timer 85 is a serial adder made up of an 18-bit shift register 86 actuated by clocks φA, φB, a control circuit 87, and an adder 88. The input signal is shifted through the shift register 86 in one data frame (136 μs), whereon the least significant bit counts 1 up. The time counted by the shift register 86, one data frame in length, is once transferred at the timing of the MSB (at the last timings of φA, φB) to a timer register 89. Using the timer 85, a timer decoder 90 prepares a timing signal for producing the control signals for the feed control and the tracking control at the timing according to the command. An encoder 91 produces the respective control signals for the feed control and tracking control based on the output of the timer decoder 90. The coincidence detection circuit 16 produces coincidence signals EEQ and EQ upon detection of coincidence between the output of the time difference output register 75 and a bit in a specified section of the timer register 89 and supplies it to the timer decoder 90 in order to switch the control upon detecting the fact that the time difference has grown smaller than a given value.

The command register 21 and the time difference output register 75 are loaded at the timing of MSB with the logical product of signals CAQ and NCTE obtained by an AND gate 79. The CAQ signal is produced each time a CAQ register 78 is set through an OR gate 77 as the Q subcode time data from the disc is newly read and written into the time difference register 10 or, alternatively, as a new command from the microcomputer 6 is received by the command buffer 81. The NCTE signal is produced to require a new command when the operation interval of one command is terminated in response to the control signals from the encoder 91.

Various control signals produced from the encoder 91 will be described below.

(1) CONTROL SIGNALS FOR THE TRACKING CONTROL

TROF (tracking servo-off signal):

This is a signal for switching off the tracking servo and produced according to the logical equation:

$$TROF = TSOF + TBKE \cdot HFSM$$

Figure 7:
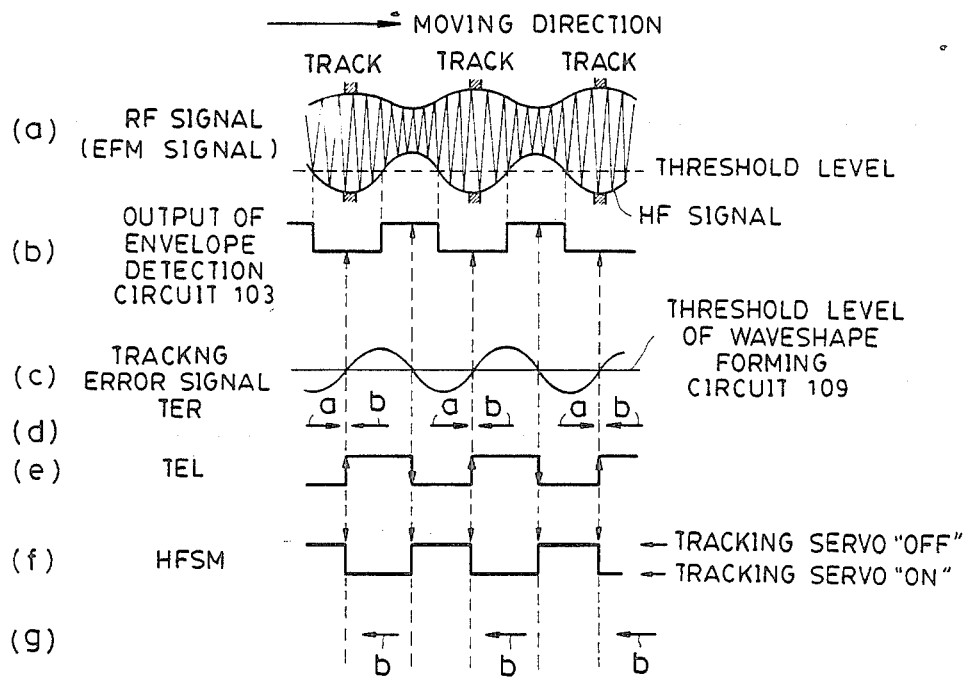
FIG. 7, consisting of (a)-(g), is a diagram showing a process of generation of a tracking servo muting signal HFSM.

The tracking servo is switched off when TROF="1" and switched on when TROF="0". TSOF is a signal which switches the tracking servo on and off periodically to enable the Q subcode to be read in skipped locations. TBKE is a tracking brake enable signal to be described below. HFSM is a tracking servo muting signal: a tracking error signal is obtained when the head is moved (fed or kicked) across the track of the disc. To facilitate the tracking, only that portion of polarity of the tracking error signal which acts to brake the head as it moves forward is used and, therefore, the opposite polarity portion is muted by HFSM. More specifically, when the head is moving, a tracking error signal TER as shown in FIG. 7(c) is obtained. If TER is used as it is for the tracking control, a force a acting in the accelerating direction and a force b acting in the braking direction are obtained alternately. As shown in FIG. 7(f), therefore, only the force b acting in the braking direction is allowed to work as shown in FIG. 7(g) by preparing the tracking servo muting signal HFSM in synchronism with the tracking error signal TER. When the head is moving in the opposite direction, since the tracking error signal TER is inverted, the force in the direction a is allowed to work so braking can be exercised in like manner.

TBKE (tracking brake enable signal):

This is a signal to determine the timing at which the tracking servo muting is effected according to said tracking servo muting signal HFSM. While the head is moving or after it has moved, TBKE rises to "1" for a given period of time during which the tracking servo muting is effected.

TRGH (tracking gain control signal):

This is a signal used to switch the tracking servo gain: in the normal playback, too high a tracking servo gain results in an instable tracking so the tracking servo gain is made to stay low. On the other hand, for such motion of the head as kicking (track jump) or feeding, the tracking servo gain is raised to obtain immediate tracking after kicking or feeding. When TRGH="1", the tracking servo gain is high and when TRGH="0", it is low.

TRHD (tracking hold signal):

Kicking causes the light beam to cross the track, generating a great tracking error signal. At this time, if the tracking servo loop is closed, this tracking error signal is fed back, rendering the tracking control after kicking instable. While kicking, therefore, the tracking error signal before the kicking is held according to the tracking hold signal TRHD and when the kicking ends, the tracking error signal is used again for the tracking control.

KP± (kick pulses):

These are signals for effecting track jump, KP+ being for an outward track jump and KP− for an inward track jump. Immediately after one of these kick pulses is generated, the other opposite kick pulse is generated to provide braking.

(2) CONTROL SIGNAL FOR THE FEED CONTROL

FEOF (feed servo-off signal):

This is a signal used to switch off the feed servo loop in any of the 0 to 3 modes or the 7-3 to 7-7 modes. A forcible feed, when accompanied with the feed servo, causes shaking. FEOF is used to switch off the feed servo in such a case. FEOF is on when FEOF="0" and off when FEOF="1".

FEM± (feed motor drive signal):

This is a signal to effect a forcible feed in the 1 mode or in any one of the 7-3 to 7-7 modes, FEM+ being for the outward feeding and FEM− for the inward feeding.

Figure 8:
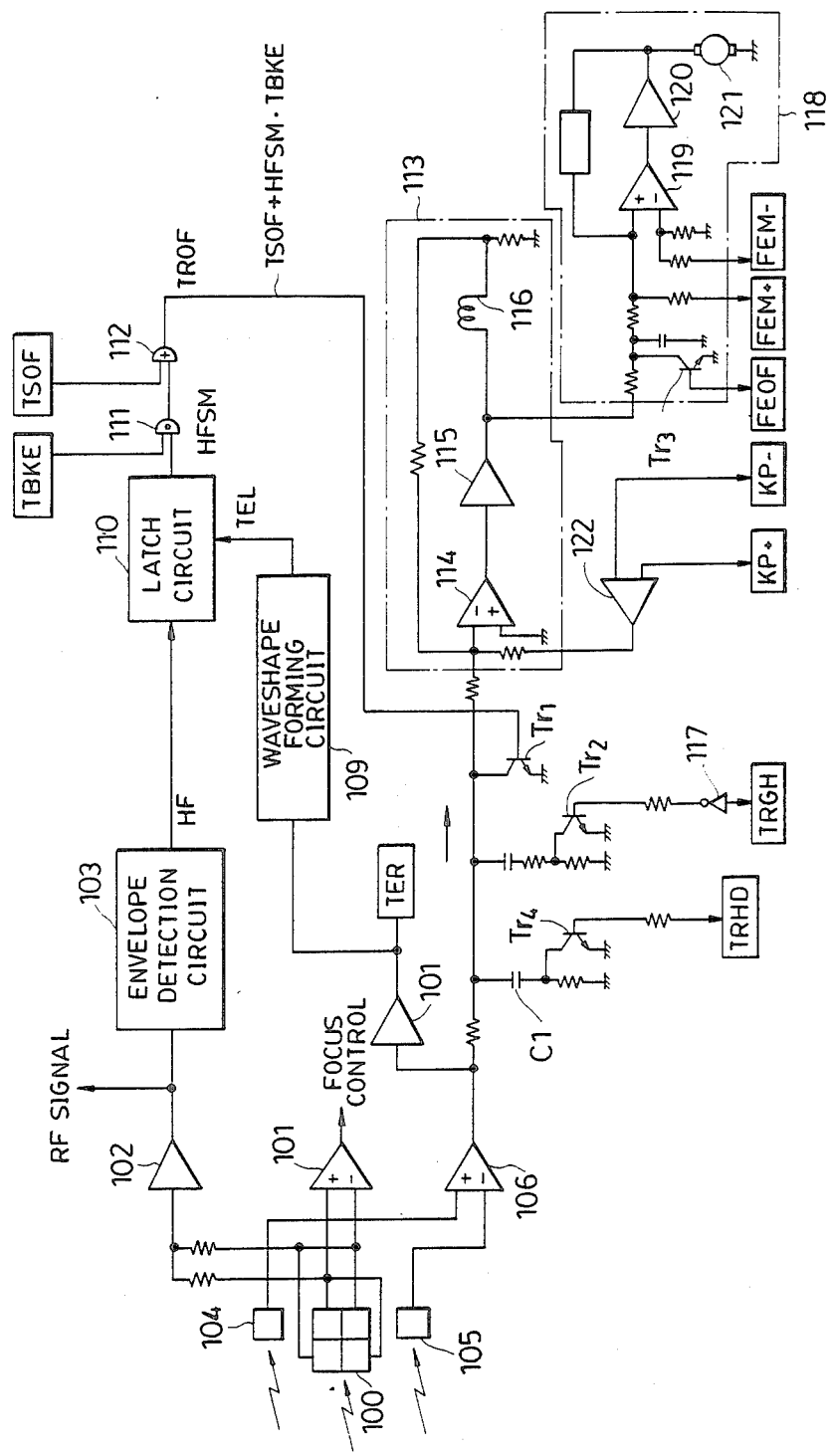
FIG. 8 is a circuit diagram showing an example of a circuit diagram showing an example of a control circuit performing tracking servo control and feed servo control.
Figure 9A:
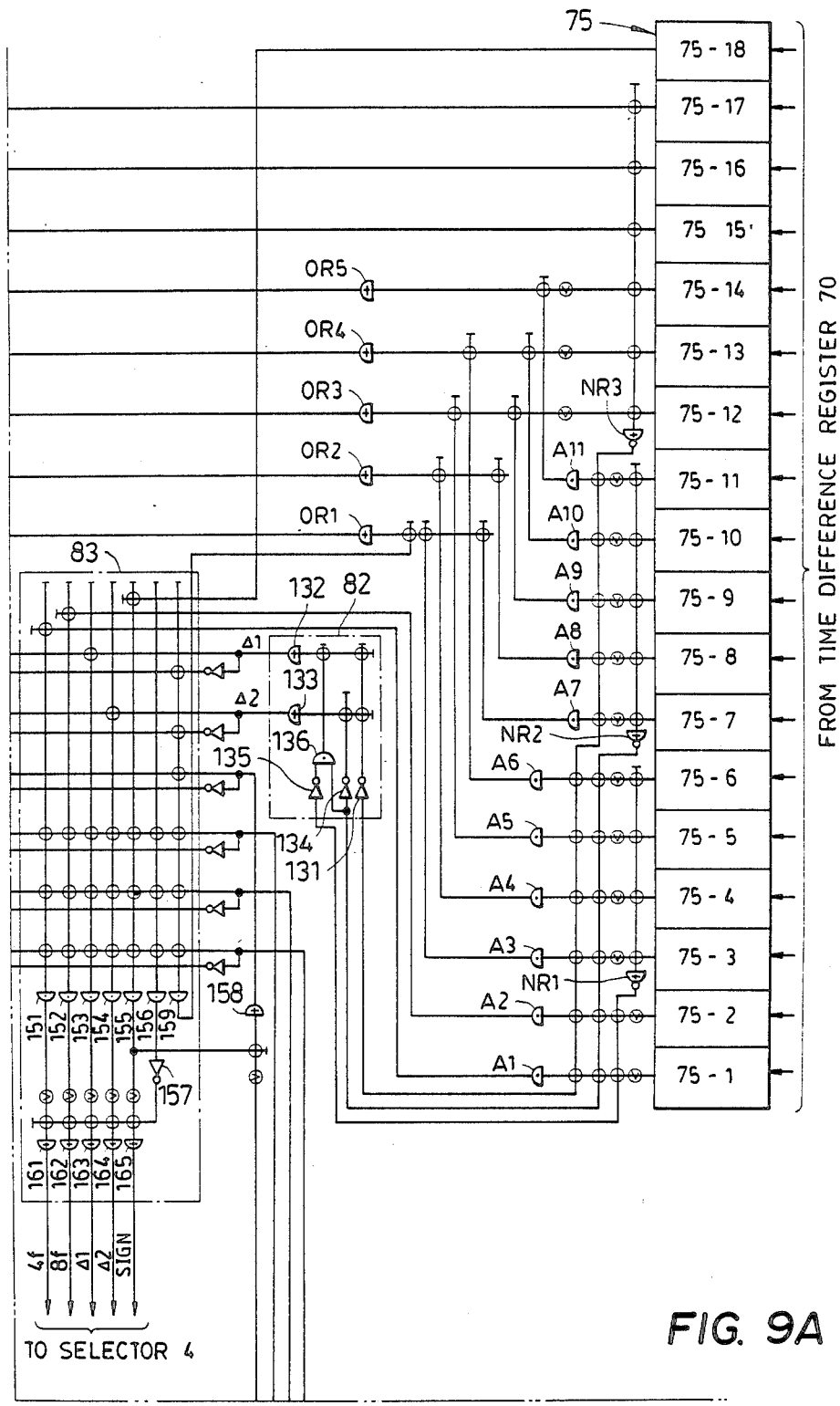
FIGS. 9A through 9F is a circuit diagram showing construction of a control logic circuit 14 in FIG. 4.
Figure 9B:
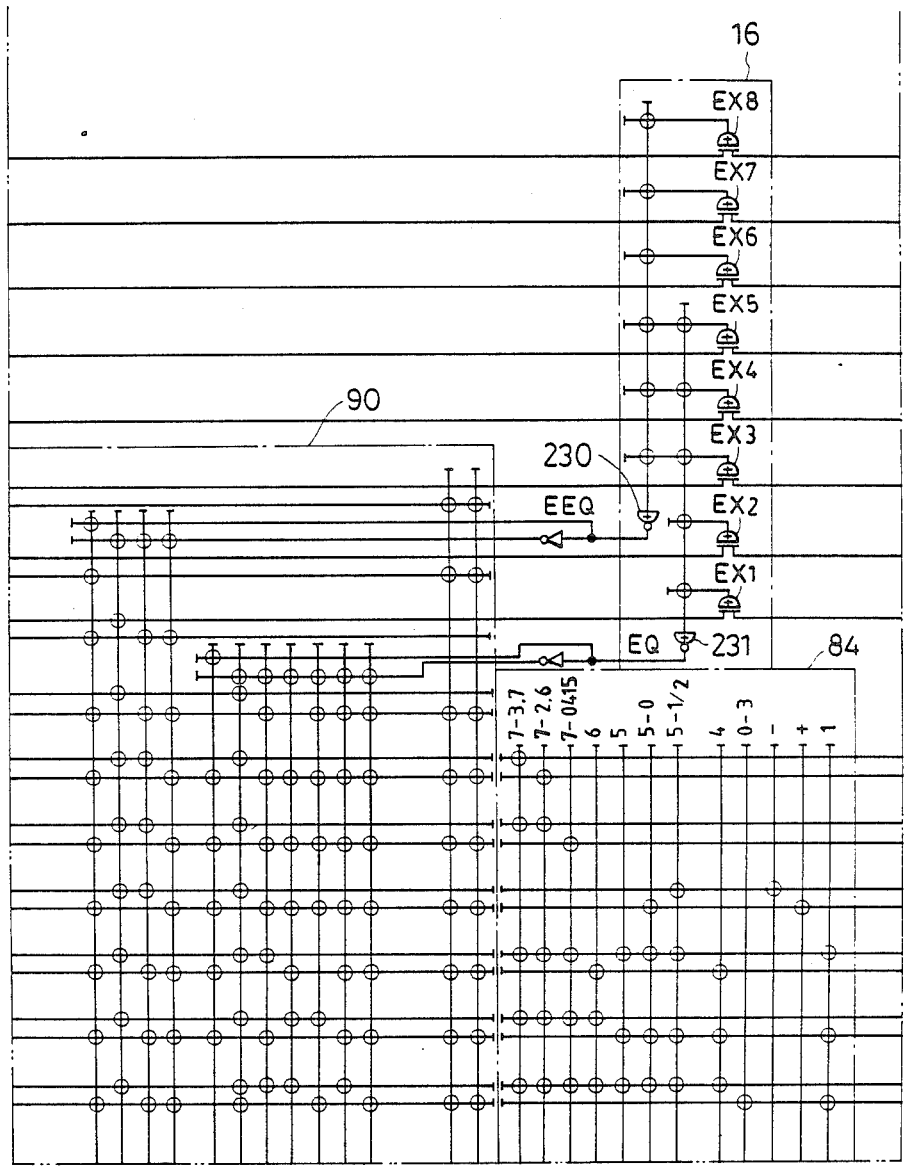
Figure 9C:
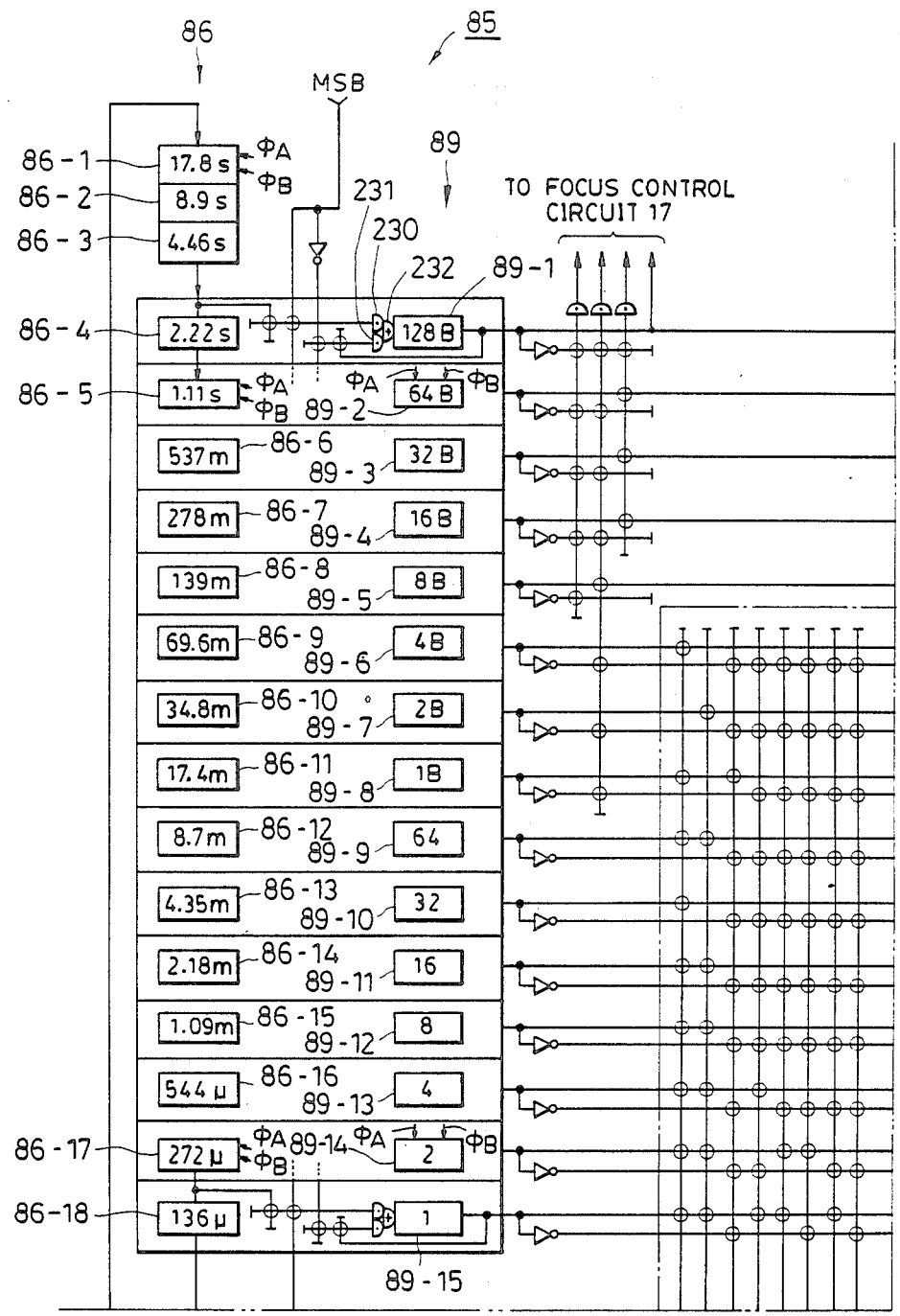
Figure 9D:
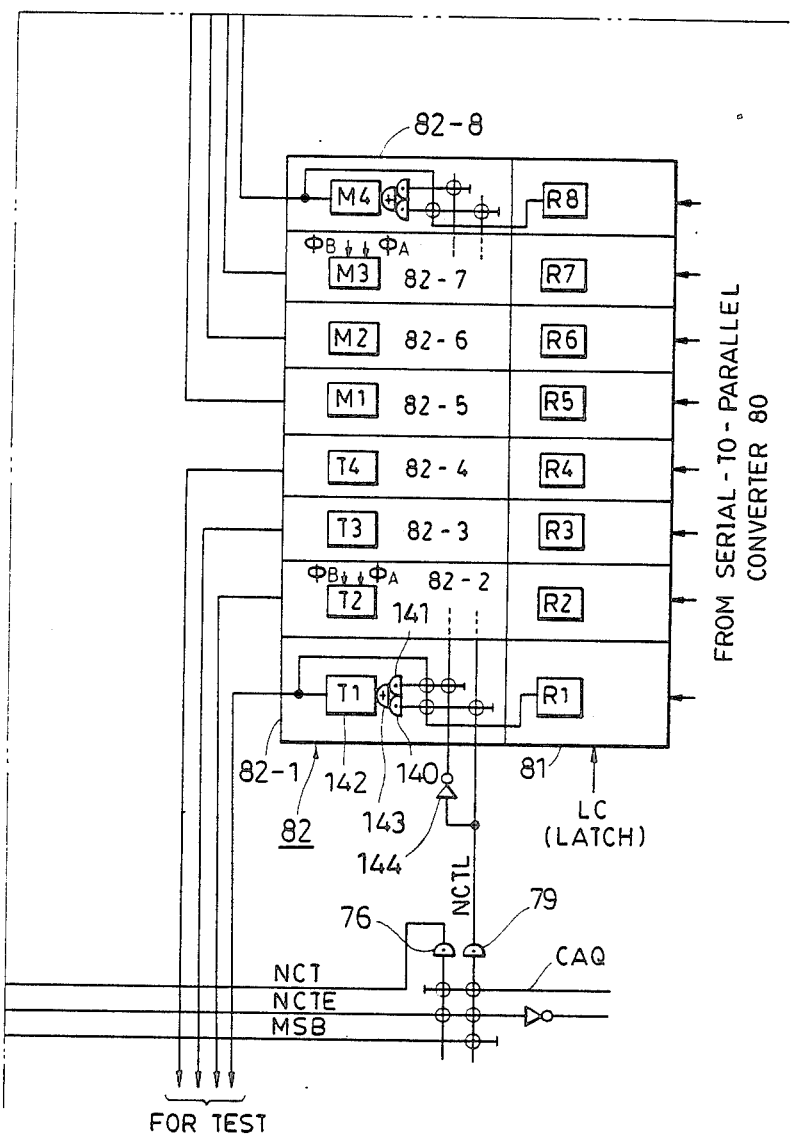
Figure 9E:
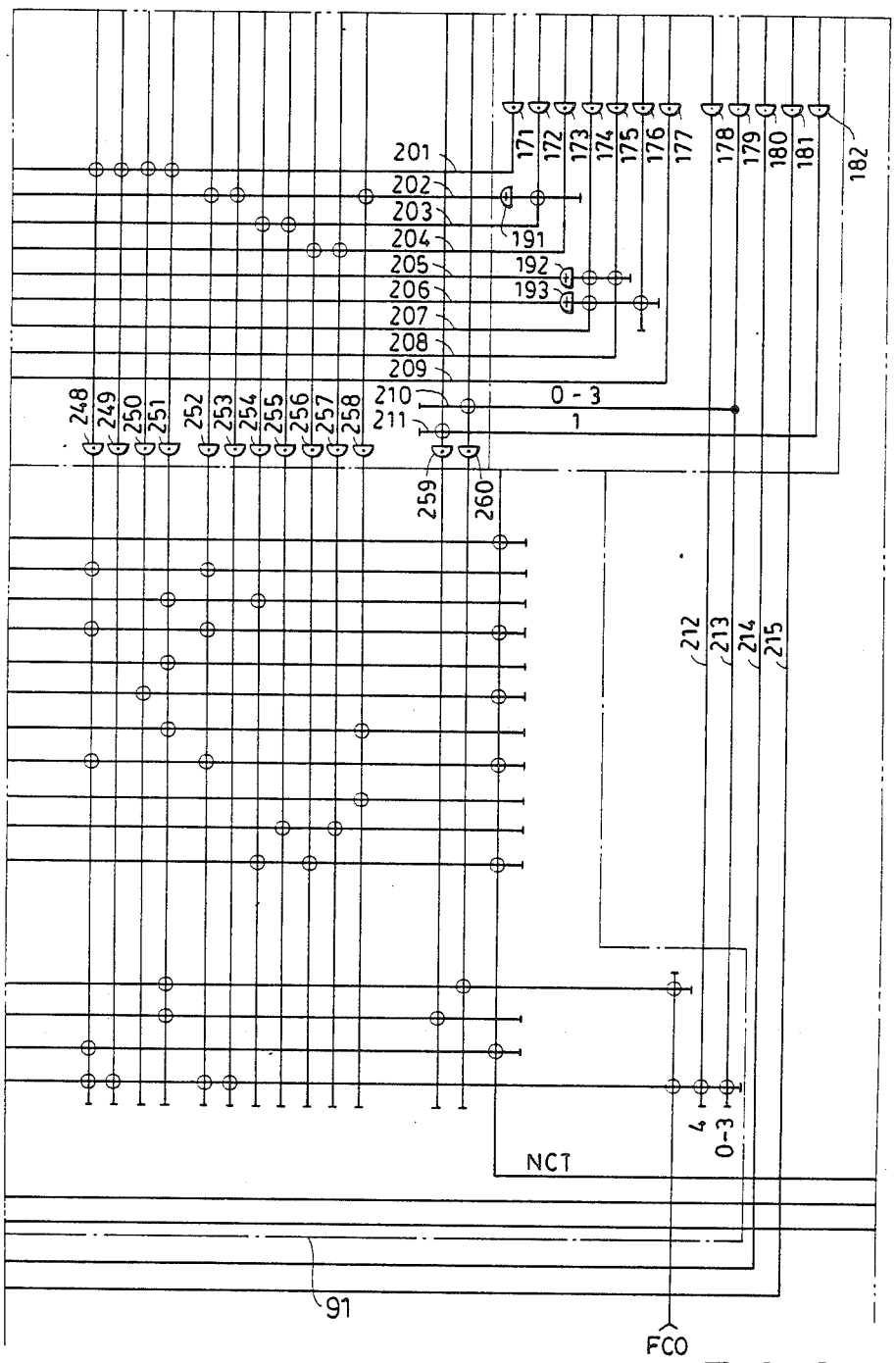
Figure 9F:
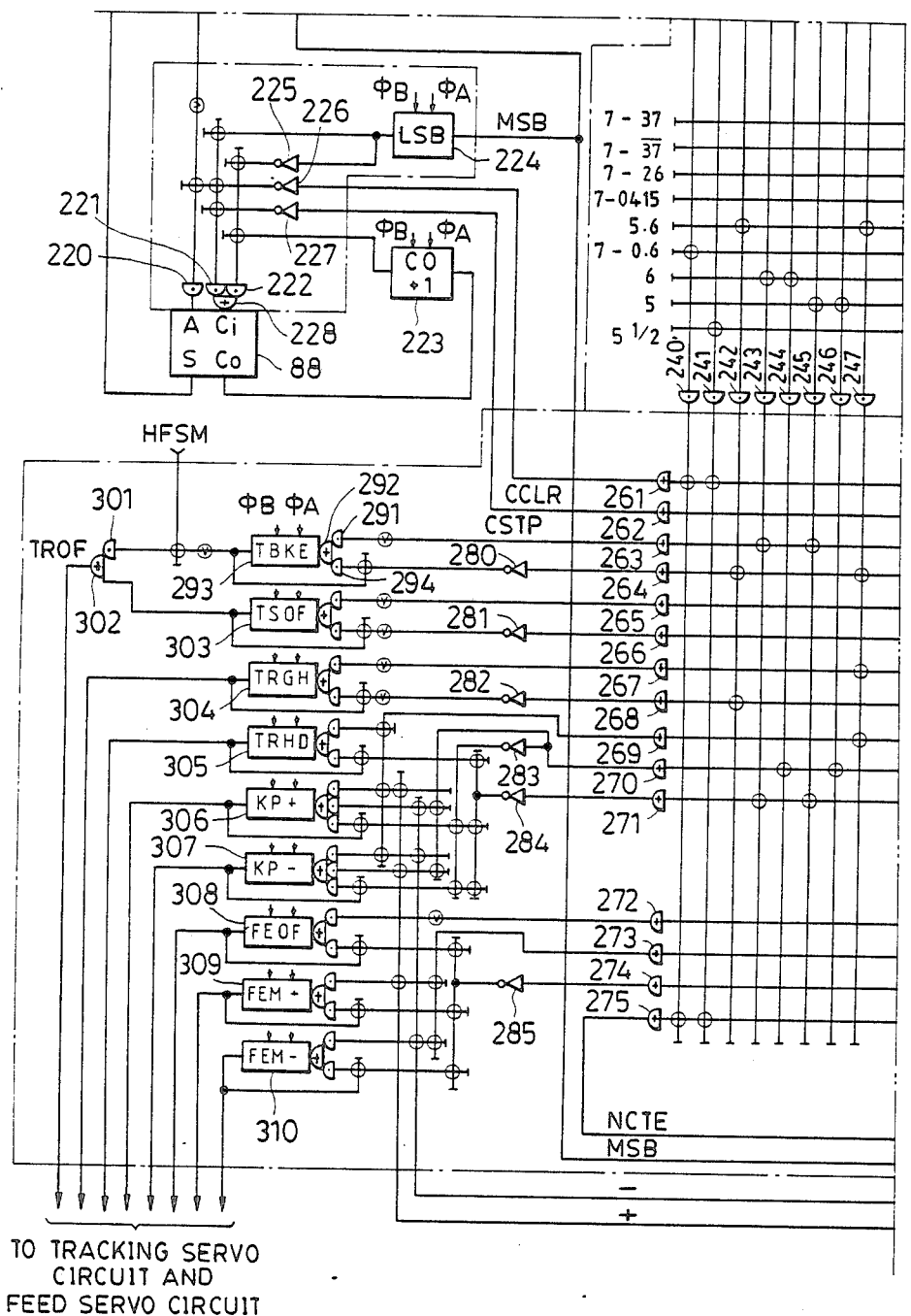

FIG. 8 shows the constitution of a tracking servo circuit and a feed servo circuit. In FIG. 8, one output of a 4-split photodiode 100 is added to its diagonal counterpart. The two addition outputs are subtracted one from the other so as to be used for the focus control. Also, these two addition outputs are added to each other by an adder 102 to produce an RF signal (FIG. 7(a)), which is delivered to a signal processing circuit (not shown) for signal reproduction. An envelope detection circuit 103 produces a signal obtained by comparing an HF signal contained in the RF signal with an appropriate threshold (FIG. 7(b)). Meantime, the signals obtained from photodiodes 104, 105 for tracking are subtracted from one another by a subtractor 106 to detect the tracking error signal TER (FIG. 7(c)).

The tracking error signal TER has its waveshape formed (zerocross detected) by a waveshape forming circuit 109. At the rise and fall of a waveshape forming signal TEL (FIG. 7(e)) from the circuit 109, the output of the envelope detection circuit 103 is latched in a latch circuit 110 to prepare said tracking servo muting signal HFSM. The tracking servo muting signal HFSM and the tracking brake enable signal TBKE are applied to an AND gate 111 to obtain the logical product. Further, this logical product and the tracking servo-off signal TSOF are applied to an OR gate 112 to obtain the logical sum being the tracking servo-off signal TROF.

The tracking error signal produced from the subtractor 106 is applied, through a servo amplifier 114 and drive amplifier 115 in a tracking servo circuit 113, to a tracking coil 116 to effect the tracking control. The tracking servo-off signal TROF turns off the tracking servo by turning a transistor Tr1 on and the tracking error signal TER off. The switching of the tracking gain is effected by applying a tracking gain high signal TRGH to a transistor Tr2 through an inverter 117. Specifically, the tracking gain is switched to the low gain by turning the transistor Tr2 on with TRGH="0" and to the high gain by turning the transistor Tr2 off with TRGH="1". The kick pulses KP+ are applied to the tracking servo circuit 113 through an amplifier 122.

A feed servo circuit 118 normally is supplied with the tracking control signal and, upon this signal reaching a given value, actuates a feed motor 121 through a servo amplifier 119 and drive amplifier 120. A forcible feed (the 1 mode or any one of 7-3 to 7-7 modes) is effected by turning the transistor Tr3 on with the feed servo-off signal FEOF so as to turn off the tracking control signal and providing feed motor drive signals FEM± instead. At this time, a transistor Tr4 is turned on in response to a tracking hold signal TRHD to hold in a capacitor C1 the tracking error signal TER in the state it assumes immediately before the head is effected and when the feed ends, the transistor Tr4 is turned off to resume the tracking control using said signal held in the capacitor C1. In this way, the tracking control can enjoy stability immediately after the feed ends.

Figure 10A:
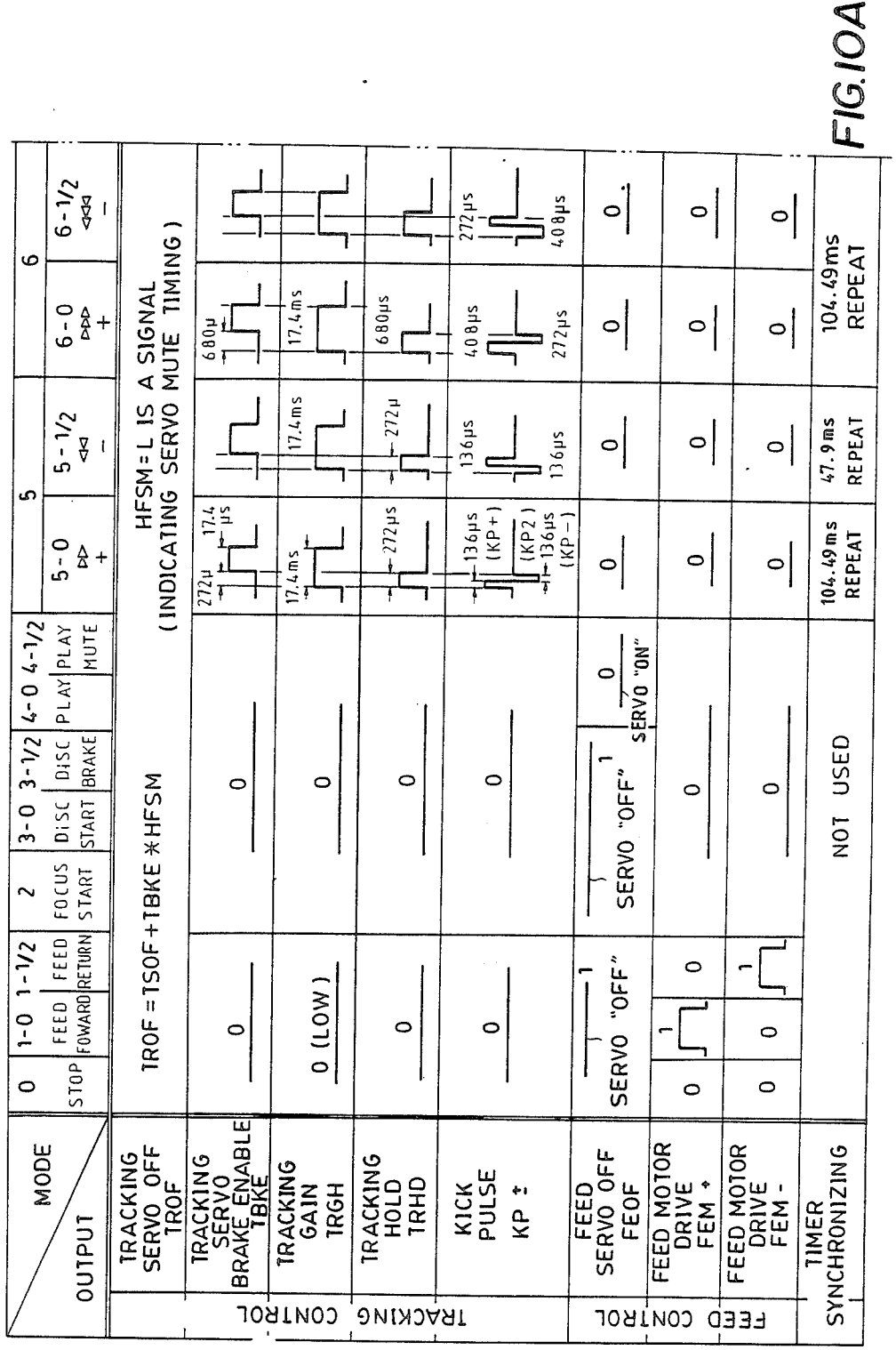
FIGS. 10A and 10B is a diagram showing contents of control performed by the circuit of FIG. 9.
Figure 10B:
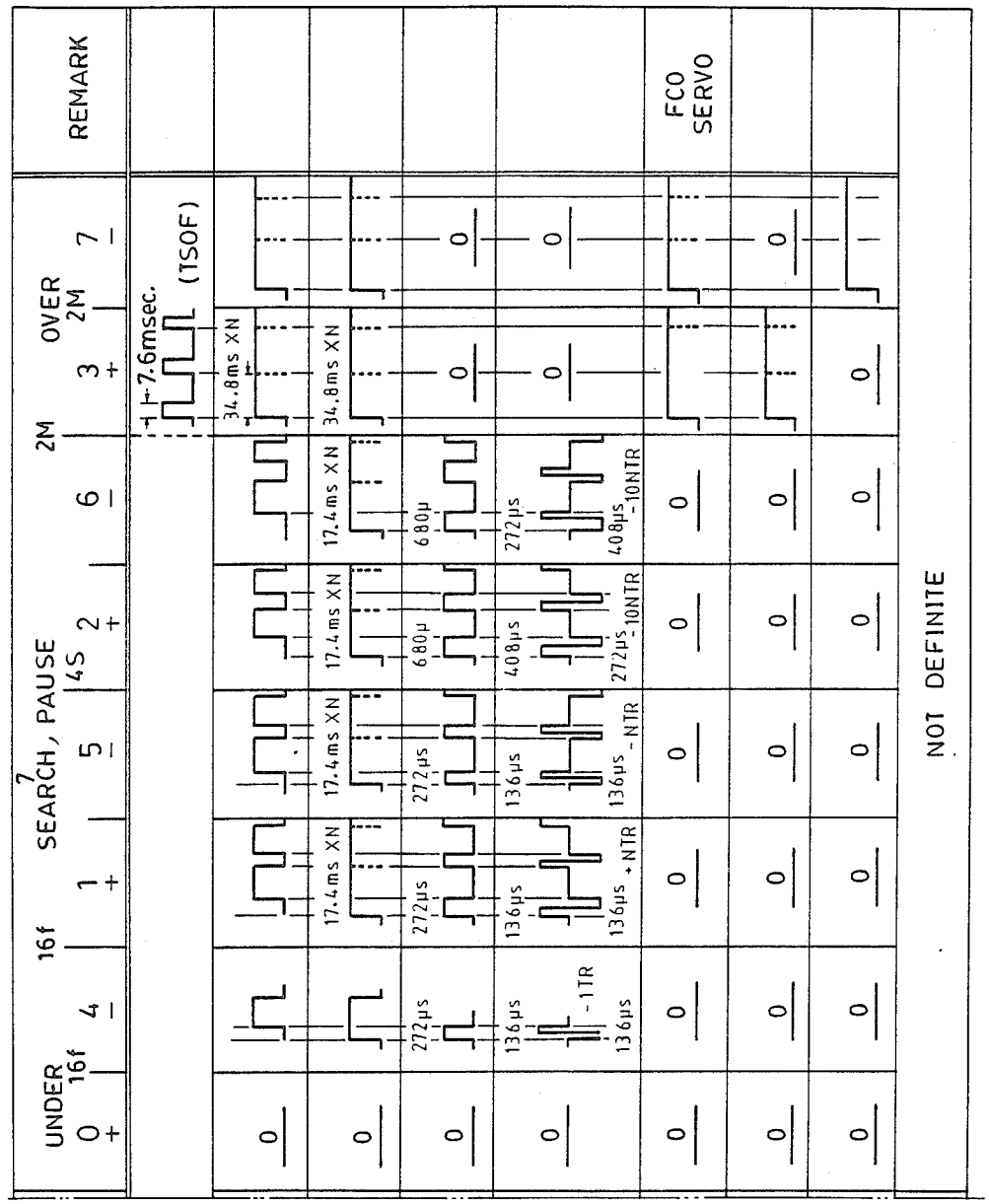

FIG. 9 shows a specific structure of the control logic 14 shown in FIG. 4. The control logic 14 shown produces various control signals for the tracking and feeding according to the operation mode as shown in FIG. 10. The controls mentioned in FIG. 10 will be each described below.

0 mode to 4 mode (a) The tracking servo is kept on all the time with TBKE="0".

(b) Because of the stable state, the servo gain is switched to the low gain with TRGH="0".

(c) In the 0 mode to 3 mode, the feed servo is turned off with FEOF="1". In the 4 mode, the feed servo is turned on with FEOF="0".

(d) In the 1-0 mode (FEED FORWARD), the feed motor is actuated so as to feed the head toward the outer tracks of the disc with FEM+="1". In the 1-½ mode (FEED RETURN), the optical head is returned to the reset position with FEM−="1".

5-0 mode (FAST FEED)

(a) A combination of the kick pulse KP+ and the brake pulse KP− is produced at intervals of 104.49 ms to allow the head to jump the tracks one by one. Both the actuating pulse KP+ and the brake pulse KP− consist of pulse strokes each lasting 136 μs.

(b) While the kick pulses KP+, KP− are generated, the actuator position data on the position of the actuator in the head before the kick, i.e., the tracking error signal, is held with TRHD="1". After the head is moved in response to the kick pulse, the tracking error signal is cleared to resume the tracking control according to that signal once held.

(c) After the kick pulses KP+, KP− are produced, the servo gain is enhanced with TRGH="1" for a certain period of time (17.4 ms) so as to facilitate application of the tracking servo.

(d) TBKE is kept at "1" for a certain time period (17.4 ms −272 82 s) after the kick pulses are produced to allow only the tracking error signal component acting to brake the head in its advance movement (FIG. 7) to work so as to enable the tracking.

5-½ mode (return)

This mode is basically reverse to the 5-0 mode: the actuating pulse KP− for inward movement is first produced, followed by the brake pulse KP+. However, in the return mode, the track advances while jumping due to the rotation of the disc. Accordingly, if the combination of the kick pulse KP− and the brake pulse KP+ were generated in this return mode at the same intervals as in the fast feed mode, the actual feed speed in the return mode would be smaller than that in the fast feed mode. According to this embodiment, therefore, the intervals at which the combination of the kick pulse KP− and the brake pulse KP+ is generated is set at such a short period as 47.9 ms in the return mode to reduce the kick repeat cycle so that the feed speed in the return mode may be equal to the feed speed in the fast forward feed mode.

6-0 mode (very fast forward feed)

(a) In this mode, the kick pulse KP+ consists of strokes each lasting for such a period as to enable the head to jump ten tracks (408 μs in this embodiment). The brake pulse KP− consists of strokes each lasting 272 μs as in the 5-0 mode.

(b) The kick pulses KP± are generated at intervals of 104.49 ms.

6-½ mode (very fast return feed)

(a) Reversely to the 6-0 mode, first the kick pulse KP− is generated at intervals of 408 μs, followed by the brake pulse KP+ which is produced at intervals of 272 μs.

(b) In the 6 mode, the advance in the track while jumping due to the rotation of the disc is of a negligeable order as compared with the advance in the 5-½ mode in relation to a great amount of jump. Accordingly, the pulses KP± are generated at intervals of 104.49 ms as in the 6-0 mode.

7 mode (search, pause)

The 7 mode is classified into four states according to the time difference between the target position and the present position.

(i) 7-3 7 (meaning 7-3 and 7-7) mode (the time difference is greater than two minutes; 7-3 is the case where the sign is +, i.e., the target position is ahead of the present position whereas 7-7 is the case where the sign is −, i.e., the target position is behind the present position.)

(a) Since the kick pulses KP± are inadequate because of a great time difference, the head is fed forcibly with FEOF="1" and with one of FEM± at "1".

(b) Meantime, TBKE="1" (the tracking brake can be effected according to the tracking servo muting signal HFSM) and TRGH="1" (the servo loop gain is switched to the high gain).

(c) The operation is repeated at intervals of 34.8 ms until the time difference is reduced to less than two minutes.

(d) The tracking servo is turned off for 7.8 ms in every interval with TSOF="1". This is to read the time data in the Q subcode in its skipped positions by effecting track jump taking advantage of the fact that the object lens or the tracking mirror oscillates freely owing to the action of the support suspension thereof, and upon jumping up to the return point of the preceding oscillation, turning on the tracking servo again to correct tracking, thus repeating this operation at intervals of 34.8 ms.

(e) The 7-3.7 mode continues at intervals of 34.8 ms until the coincidence detection signal EEQ produced from the coincidence detection circuit 16 detects that the time difference is less than two minutes.

(ii) 7-2.6 mode (in which the time difference ranges from four seconds to two minutes; the sign is + in 7-2 and − in 7-6).

The kick pulses KP± produced in this mode cause a jump over ten tracks. The kick pulses KP± are generated repeatedly at intervals of 17.4 ms until it is detected as EQ from the coincidence detection circuit 16 goes to "1" that the time difference has approximated to less than four seconds.

(iii) 7-1.5 mode (the time difference is equal to or less than 16f; the sign is+ in 7-0 and− in 7-4)

(a) A one-track jump is effected in the 7-4 mode only once and not repeated.

(b) In the 7-0 mode, since the target position is ahead of the present position, it is possible in the normal playback to reach the target position with the disc rotating. Therefore, arrival at the target position is only to be awaited without performing any further operation. Upon detecting arrival at the target position while reading the 4f, 8f and sign bit signals from the time difference output register 25 by the microcomputer 6, either the operation is placed on standby or the playback is performed.

Note that since, as mentioned above, the respective feed controls in the 5 mode, 6 mode, 7-3.7 mode (the 7 mode excluding 7-3 and 7-7) are effected according to the tracking control signals, no special signals are required for the feed controls.

Description will now be made on the control logic 14 shown in FIG. 9 which effects the controls shown in FIG. 10.

In FIG. 9, NOR gates NR1 to NR3 provided on the output side of the time difference output register 75 detect in which range the time difference data planted in the time difference output register 75 may be determined so as to switch said 7 mode control according to the time difference. Specifically, the NOR gate NR1 is supplied with the signals of the bits 75-3 to 75-6 of the time difference output register 75 corresponding to 16f to 2 seconds. Therefore, when the output of the NOR gate NR1 is "1", it can be known that none of the signals of these bits are "1". The NOR gate NR2 is supplied with the signals of the bits 75-7 to 75-11 corresponding to 4 seconds to 1 minute, respectively. Therefore, when the output of the NOR gate NR2 is "1", it can be known that none of the signals of these bits is "1". The NOR gate NR3 is supplied with the signals of the bits 75-12 to 75-17 corresponding to 2 minutes to 64 minutes, respectively. Therefore, when the output of the NOR gate NR3 is "1", it can be known that none of the signals of these bits is "1". Accordingly, it is possible to determine in which time range the time difference falls by knowing the combination of the output signals of the NOR gates NR1 to NR3 as shown in Table 4.

TABLE 4

| combination of outputs NR1 to NR3 | time difference |
|---|---|
| NR3 = "1" | more than 2 min. |
| NR3 = "0" | 2 min. to 4 sec. |
| NR2 = "1" | |

TABLE 4-continued

| combination of outputs NR1 to NR3 | time difference |
|---|---|
| NR3 = "0" | 16f to 4 sec. |
| NR2 = "0" | |
| NR1 = "0" | |
| NR = "0" | more than 16f |
| NR2 = "0" | |
| NR1 = "0" | |

The decoder 82 detects this range of the time difference and produces the 2-bit signal Δ1, Δ2 according to this time difference. More specifically, the output of the NOR gate 3 is applied to OR gates 132, 133 through an inverter 131. The output of the NOR gate NR2 is applied to the OR gate 132 through an AND gate 136 and to the OR gate 133 through an inverter 134. The output of the NOR gate NR1 is applied through an inverter 135 to the AND gate 136, of which the output is applied to the OR gate 132. Thus, the OR gates 132, 133 produce the signal Δ1, Δ2, respectively. Table 5 shows the time difference ranges indicated by the combinations of the 2-bit signal Δ1, Δ2, respectively.

TABLE 5

| | Δ1 | Δ2 |
|---|---|---|
| more than 2 min. | 1 | 1 |
| 4 sec. to 2 min. | 0 | 1 |
| 16f to 2 min. | 1 | 0 |
| less than 16f | 0 | 0 |

As mentioned above, the command register 82 comprises eight bits 82-1 to 82-8. Each of these bits 82-1 to 82-8 is provided with an AND gate 140 supplied with the bit signals of the new command held in the command buffer 81, a register 142 to which the output of the AND gate 140 is supplied through an OR gate 143 so as to be latched therein according to the clocks φA, φB, and an AND gate 141 which feeds back the supplied output of the register 142 to the OR gate 143 so that the data latched in the register 142 may be self-held in the OR gate 143. The AND gate 140 is supplied with a new command receiving signal NCTL providing a timing according to which data is transferred from the corresponding registers R1 to R8 of the command buffer 81 to registers T1 to T8. The AND gate 141 is supplied with the inverse of the new command receiving signal NCTL through an inverter 144, this inverse signal providing a timing at which the data transferred to the registers T1 to T8 is self-held. As mentioned, the most significant four bits 82-5 to 82-8 of the command register 82 are used for the command and the least significant four bits 82-1 to 82-4 for the test. The content of each command is shown in Table 2. The time difference decoder 83 is provided to decode the time difference data. The decoder 83 is supplied with the time difference data 4f, 8f, Δ1, Δ2 and SIGN as described below:

4f: This data indicates that the first bit 75-1 of the time difference output register 75 is "1", i.e., the time difference includes a component not less than 4f but less than 8f. If the signal 4f is "1" while all the other signals 8f, Δ1, Δ2 are "0", it can be determined that the time difference is not less than 4f but less than 8f.

8f: This signal indicates that the second bit 75-2 of the time difference output register 75 is "1", i.e., the time difference includes a component not less than 8f but less than 16f. If the signal 8f is "1" while the signals Δ1, Δ2 are both "0", the time difference can be determined to be not less than 8f but less than 16f.

Δ1, Δ2: The combination of these signals or the outputs of said decoder 82 indicates in which range the time difference can be determined (see Table 4).

SIGN: This signal, supplied from the most significant bit 75-24 of the time difference output register 75, indicates the sign+ or − of the time difference. Specifically, SIGN="1" indicates "−" (the target address is behind the present address) and SIGN ="0" indicates "+" (the target address is ahead of the present address).

In the time difference decoder 83, said signals 4f, 8f, Δ1, Δ2, SIGN are applied to AND gates 151 to 155, respectively. The AND gates 151 to 155 are commonly supplied with the signals from the respective bits 82-8, 82-7, 82-6 of the command register 82 corresponding respectively to the bits M4, M3, M2 of the command. Therefore when M4, M3, M2 are all "1", i.e., in the 7 mode (search mode, pause mode), the AND gates 151 to 155 are ready to produce the respective signals 4f, 8f, Δ1, Δ2, SIGN. The outputs of the AND gates 151 to 155 are applied to OR gates 161 to 165, respectively. The OR gates 161 to 165 are supplied through an inverter 157 with the inverse of the output of an AND gate 156 which in turn is supplied with the bit signals M4, M3, M2 of the command. Therefore, the OR gates 161 to 165 produce the respective signals 4f, 8f, Δ1, Δ2, SIGN in the 7 mode, while in the other operation modes than the 7 mode, the time difference data is not produced since the outputs of the OR gates 161 to 165 are all "1" because of the inverse signal from the inverter 157.

In the 7 mode, the time difference data produced from the OR gates 161 to 165 are transferred to the microcomputer 6 through the selector 4, as mentioned (FIG. 3). Note that in the time difference decoder 83, the sign signal SIGN produced from the AND gate 155 showing a plus or minus sign of the time difference data is placed via an OR gate 158 on the signal line of the M1 bit of the command (the bit 82-5 of the command register 82). Thus, this signal line is used to transfer the sign of the time difference in the 7 mode taking advantage of the fact that while the M1 bit of the command originally is used to distinguish the command names with "½" from those without it (FIG. 2), the M1 bit is allowed to remain "X" (="0") all the time in the 7 mode where such distinction is unnecessary. In the other mode than the 7 mode, since the output of the AND gate 155 is "0", the OR gate 158 produces the signal of the command bit M1. Meantime, the AND gate 159 produces a signal indicating the 7-4 mode (the search mode where the time difference is equal to or less than −16f). This signal is used to limit the number of kicks in the 7-4 mode to one so as not to repeat the operation.

A command decoder 84 decodes the command produced from the command register 21 by AND gates 171 to 182 and AND gates 191 to 193. In the 7 mode (search, pause), the command is classified into four categories according to the time difference data Δ1, Δ2. As a result, the command decoder 84 produces commands as shown in Table 6 through its output lines 201 to 215.

TABLE 6

| reference numeral of output lines | name of command | contents of command |
|---|---|---|
| 201 | 7-3·7 | 7-3 mode or 7-7 mode |
| 202 | 7-3·7̄ | modes other than 7-3, 7-7 (any one of 7-1, 7-2, 7-4, 7-5, 7-6). |
| 203 | 7-2·6 | 7-2 mode or 7-6 mode |
| 204 | 7-0,4,1,5 | any one mode of 7-0, 7-4, 7-1, 7-5 |
| 205 | 5, 6 | 5 mode or 6 mode |
| 206 | 5-0 6 | 5-0 mode or 6 mode |
| 207 | 6 | 6 mode (6-0 mode or 6-½ mode) |
| 208 | 5 | 5 mode |
| 209 | | 5-½ mode |
| 210 | 0~3 | one of the modes 0, 1, 2, 3 |
| 211 | 1 | 1 mode |
| 212 | 4 | 4 mode |
| 213 | 0~3 | one of the modes 0, 1, 2, 3 |
| 214 | − | modes with ½ at the end: in the 7 mode, those modes where the time difference is "−". |
| 215 | + | modes without ½ at the end: in the 7 mode, those modes where the time difference is "+". |

A shift register 86 in a timer 85 consists of 18 bits (86-1 to 86-18) through which data is sequentially shifted according to the clocks φA, φB in the order of 86-1→86-2→...→86-18 The output of the final bit 86-18 is applied to the A input of an adder 88 via an AND gate 220 and returned to the first bit 86-1 from the S output of the adder 88. Because the clocks φA, φB provide a timing of an 18th of one data frame (136 μs), data is shifted through the shift register 86 in one data frame. Meantime the signal MSB (the signal of the final of the one-18th data frame bits) is delayed one bit by a register 224 so that the signal "1" may be applied to the carry input Ci of the adder 88 at the timing of the first bit LSB in the next data frame. The carry output Co of the adder 88 is delayed one bit by a register 223 before being applied to the carry input Ci. Thus the count in the shift register 86 is increased one by one when viewed at the timing of the final bit MSB in each data frame. Since one data frame is 136 μs, the respective bits of the shift register 86 correspond to the times as shown in Table 7.

TABLE 7

| bit | time | bit | time |
|---|---|---|---|
| 86-1 | 17.8 S | 86-10 | 34.8 ms |
| 86-2 | 8.9 S | 86-11 | 17.4 ms |
| 86-3 | 4.46 S | 86-12 | 8.7 ms |
| 86-4 | 2.22 S | 86-13 | 4.35 ms |
| 86-5 | 1.11 S | 86-14 | 2.18 ms |
| 86-6 | 557 ms | 86-15 | 1.09 ms |
| 86-7 | 278 ms | 86-16 | 544 μs |
| 86-8 | 139 ms | 86-17 | 272 μs |
| 86-9 | 69.6 ms | 86-18 | 136 μs |

In the shift register 86, the least significant 15 bits (86-4 to 86-18) are used. More specifically, the signals of those 15 bits are loaded in the respective bits 89-1 to 89-15 of the timer register 89 at the timing of the signal MSB through an AND gate 230 and an OR gate 232 and held therein through an AND gate 231 for one data frame.

Thus data obtained from the timer 85 increases by one in every 136 μs. The timer 85 stops counting when a count stop signal CSTP rises to "1" to turn off an AND gate 221 through an inverter 227 so that the signal "1" may not be applied to the timer 85 at the timing of LSB. When a count clear signal CCLR rises to "1" to turn off the AND gates 220, 221 through an inverter 226, the output of an adder 88 is turned to "0". When this state has continued for one data frame, the timer 85 is reset.

The coincidence detection circuit 16, provided with exclusive OR gates Ex 1 to Ex 8, compares given bits of the time difference output register 75 with corresponding bits of the timer 85 and, when the NOR gate 230 or 231 detects coincidence between all of the compared bits, produces the coincidence signal EEQ or EQ. While the time data of the timer 85 applied to the exclusive OR gates Ex 1 to Ex 8 is the same for all the modes, the time difference data from the time difference output register 75 is switched according to the mode as shown in Table 8.

TABLE 8

| | input data | | | |
|---|---|---|---|---|
| | time data | time difference data | | |
| exclusive OR gate | of timer 85 | 7-3.7 mode | 7-2.6 mode | 7-1.5 mode |
| Ex 8 | 2.22 S | 64 min. | — | — |
| Ex 7 | 1.11 S | 32 min. | — | — |
| Ex 6 | 557 ms | 16 min. | — | — |
| Ex 5 | 278 ms | 8 min. | 1 min. | — |
| Ex 4 | 139 ms | 4 min. | 32 sec. | 2 sec. |
| Ex 3 | 69.6 ms | 2 min. | 16 sec. | 1 sec. |
| Ex 2 | 34.8 ms | — | 8 sec. | 32 f |
| Ex 1 | 17.4 ms | — | 4 sec. | 16 f |

The time difference data is switched according to the mode by the NOR gates NR1 to NR3. Specifically, in the 7-3.7 mode (the time difference is greater than ± two minutes), since one of the bits corresponding to 2 minutes to 64 minutes of the time difference output register 75 rises to "1", the output of the NOR gate NR3 is turned to "0". Accordingly, AND gates A1 to A11 are turned off and all the outputs of the bits corresponding to 4 frames to 1 minute are turned off. At this time, therefore, the output of the bits corresponding to 2 minutes to 64 minutes are applied to the exclusive OR gates Ex 3 to Ex 8.

In the 7-2.6 mode (the time difference is not less than ± four seconds and less than ± two minutes), since the bits corresponding to 2 minutes to 64 minutes of the time difference output register 75 are all "0", the output of the NOR gate NR3 is "1". In the meantime, since one of the bits corresponding to 2 seconds to 1 minute of the time difference output register 75 rises to "1", the NOR gate NR2 is turned off. Thus, at this time, the AND gates A1 to A6 are turned off while the AND gates A7 to A11 are ready to be turned on, whereupon the outputs of the bits corresponding to 4 seconds to 1 minute of the time difference output register 75 are applied to the exclusive OR gates Ex 1 to Ex 5 through OR gates OR1 to OR5.

In the 7-1.5 mode (the time difference is not less than ±16f and less than four seconds), since the bits corresponding to 4 seconds to 64 minutes of the time difference output register 75 are all "0", the outputs of the NOR gates NR2, NR3 are "1". Meantime, since one of the bits corresponding to 16f to 2 seconds of the time difference output register rises to "1", the NOR gate NR1 is turned off. Accordingly at this time, the AND gates A1, A2, A7 to A11 are turned off while the AND gates A3 to A6 are ready to be turned on, whereupon bit outputs corresponding to 16f to 2 seconds of the time difference output register 75 are applied to the exclusive OR gates Ex 1 to Ex 4 through the OR gates OR1 to OR4.

In the coincidence detection circuit 16, since the NOR gate 230 has seen the coincidence between the data applied to the exclusive gates Ex3 to Ex 8, the coincidence detection signal EEQ produced from the NOR gate 230 indicates that the count of the timer 85 has increased by the time correlated with the time difference in the 7-3.7 mode. In the meantime, since the NOR gate 231 has seen the coincidence between the data applied to the exclusive OR gates Ex 1 to Ex 5, the coincidence detection signal EQ indicates that the count of the timer 85 has increased by the time correlated with the time difference in the 7-2.6 mode or 7-1.5 mode. This coincidence detection operation is used to effect a control whereby the present position is caused to approach the target position by carrying out the search operation by the time provided by the timer 85 correlated with the time difference in the search mode. Specifically the time given by the timer 85 correlated with the time difference is a value previously obtained by calculation from the motion speed in the search mode as a search mode operation time in which it is expected that the time difference can be brought to almost 0 (i.e., the present position can be brought almost to the target position). Since the signals are recorded on a compact disc at a constant speed along the track line, the number of tracks traced in a given time is different between the inner tracks and the outer tracks and, therefore, a one-to-one correspondence cannot of course be established between the time difference and the search time in which to approximate the time difference to 0. However, if the time difference can be approximated close to 0, the target position can be finally attained by repeating a control in which the time difference data approximating closer and closer to the target position every moment is substituted one for another sequentially.

The correspondence between the time difference and the time data provided by the timer 85 varies according to the mode as shown in Table 8 because the feed amount per unit time varies with the mode. More specifically, in the 7-3.7 mode where the feed amount per unit time is relatively great because of the continuous drive by the feed motor, relatively great time differences are correlated with the respective time data provided by the timer 85. In the 7-2.6 mode where a ten-track jump kick is effected at 17.4 ms intervals, the feed amount per unit time is smaller than in the 7-3.7 mode so that the time differences correlated with the respective time data provided by the timer 85 are smaller than the corresponding time differences in the 7-3.7 mode. In the 7-1.5 mode where a one-track jump kick is effected at 17.4 ms intervals, the feed amount per unit time is even smaller than in the 7-2.6 mode so that the time differences correlated with the time data provided by the timer 85 are still smaller than the corresponding time differences in the 7-2.6 mode. For example, a time 139 ms provided by the timer 85 corresponds to a feed time in which to approximate a time difference of four minutes to about 0 in the 7-3.7 mode and that time 139 ms corresponds to a feed time in which to approximate a time difference of 32 seconds to about 0 in the 7-2.6 mode while the same time 139 ms corresponds to a feed time in which to approximate a time difference of two seconds to about 0 in the 7-1.5 mode.

In general, if the present time represented in the Q subcode could be read without fail, the search mode control would need only be effected so as to bring the time difference to 0 based solely on the data of time difference between the present time and the target time. Practically, however, the present time in the Q subcode often cannot be read in the search mode, in which case the control based on the past time difference data could result in passing by the target position a great amount in the event the Q subcode cannot be read for a long period of time. In contrast, the feed based on a feed time, which is preset against time difference data and in which the time difference is brought to 0, does not result in passing by the target position a great amount even if the Q subcode cannot be read for a long period of time, for the feed then can be effected for the period of time preset against the preceding time difference data so as to stop near the target position. Subsequently, upon obtaining the Q subcode, the time difference can be newly calculated and the feed time likewise preset for the feed to be effected accordingly until finally the target position is safely attained.

In FIG. 4, a timer decoder 90 is supplied with command data from the command decoder 84 and the coincidence detection signals EEQ, EQ from the coincidence detection circuit 16 and, correspondingly to these data, prepare timing signals used to prepare various control signals (TBKE, TSOF, TRHD, etc.) using the timer 85. The timer decoder 90 produces from its AND gates 240 to 260 the following signals:

AND gate 240: a signal which is "1" when the timer 85 is providing time data of 104.49 ms in the 5-0 mode or 6 mode; this is a signal for securing time intervals of 104.49 ms and used to reset the timer 85 as well as to prepare a next command demand signal NCTE.

AND gate 241: a signal which is "1" when the timer 85 is providing time data of 47.9 ms in the 5-½ mode; this is a signal for securing time intervals of 47.9 ms and used to reset the timer 85 as well as to prepare the next command demand signal NCTE.

AND gate 242: a signal which is "1" when the timer 85 is providing time data of 17.4 ms; this signal is used to reset the tracking brake enable signal TBKE and the tracking gain high signal TRGH.

AND gate 243: a signal which is "1" when the timer 85 is providing time data of 680 ms in the 6 mode; this signal is used to set the tracking hold signal TRGH as well as to reset the kick pulses KP±.

AND gate 244: a signal which is "1" when the timer 85 is providing time data of 408 $\mu$s in the 6 mode; this signal is used to provide a timing at which to invert the kick pulses KP± to apply braking.

AND gate 245: a signal which is "1" when the timer 85 is providing time data of 272 $\mu$s in the 5 mode; this signal is used to set the tracking brake enable signal TBKE as well as to reset the kick pulses KP±.

AND gate 246: a signal which is "1" when the timer 85 is providing time data of 136 $\mu$s in the 5 mode; this signal is used to secure the timing at which to invert the kick pulses KP± to apply braking.

AND gate 247: a signal which is "1" when the timer 85 is 0 sec. in the 5 mode; this signal is used to reset the tracking brake enable signal TBKE as well as to set the tracking gain high signal TRGH and the kick pulses KP±.

AND gate 248: a signal which is turned to "1" when the coincidence detection signal EEQ is produced in the 7-3.7 mode; this signal is used to reset the timer 85, the tracking brake enable signal TBKE and the tracking gain high signal TRGH as well as to end the forcible feed and restore the feed servo.

AND gate 249: a signal which is "1" when the timer 85 is providing time data of 34.8 ms in the 7-3.7 mode; this signal is used to prepare the new command demand signal NCTE in every 34.8 ms.

AND gate 250: a signal which is "1" when the timer 85 is providing time data of 7.6 ms in the 7-3.7 mode; this signal is used to periodically turn the tracking servo on and off so as to determine the time intervals of the tracking servo-off signal TSOF for reading the Q subcode in its skipped positions.

AND gate 251: a signal which is "1" when the timer 85 is 0 sec.; this signal is used to set the tracking brake enable signal TBKE, tracking servo-off signal TSOF, and the tracking gain high signal TRGH as well as to turn off the feed servo so as to set the feed motor drive signals FEM± for the forcible feed.

AND gate 252: a signal which is turned to "1" when the coincidence signal EQ is produced in the 7-3.7 mode; this signal is used to reset the timer 85, the tracking brake enable signal TBKE and the tracking gain high signal TRGH as well as to prepare the new command demand signal NCTE.

AND gate 253: a signal which is "1" when the timer is providing time data of 17.4 ms in the 7-3.7 mode; this signal is used to prepare the new command demand signal NCTE in every 17.4 ms.

AND gate 254: a signal which is "1" when the timer 85 is providing time data of 680 µs; this signal is used to set the tracking brake enable signal TBKE as well as to reset the kick pulses KP±.

AND gate 255: a signal which is "1" when the timer 85 is providing time data of 408 µs in the 7-2.6 mode; this signal is used to invert the kick pulses KP± to apply braking.

AND gate 256: a signal which is "1" when the timer 85 is providing time data of 272 µs in the 7-0.4.1.5 mode; this signal is used to set the tracking brake enable signal TBKE as well as to reset the kick pulses KP±.

AND gate 257: a signal which is "1" when the timer 85 is providing time data of 136 µs in the 7-0.4.1.5 mode; this signal is used to reset the tracking brake enable signal TBKE as well as to set the tracking gain high signal TRGH and the kick pulses KP±.

AND gate 259: a signal which is "1" when the timer 85 is 0 sec.; this signal is used to prepare the feed motor drive signal FEM± for the forcible feed.

AND gate 260: a signal which is "1" when the timer 85 is 0 sec. in any of the 0 to 3 modes; this signal is used to set the feed servo-off signal FEOF to turn off the feed servo for feeding according to the feed motor drive signals FEM±.

The above signals produced from the AND gates 240 to 261 of the timer decoder 90 are applied to corresponding OR gates 261 to 275 so as to be used respectively. The output signals of these OR gates 261 to 275 are used respectively for the following purposes:

OR gate 261: a signal CCLR to reset the timer 85; this signal is produced when the AND gate 76 produces the signal NCT upon the AND gate 76 being supplied with said signal CAQ (a signal produced each time the new command is received from the microcomputer 6 or, in the 7 mode, each time the Q subcode is read and new time difference data is calculated) and the new command demand signal NCTE. The signal CCLR is also produced in response to the output signal of the AND gate 240 or 241 for securing intervals for the 5 mode or the 6 mode. This is to reset the timer 85 directly by the outputs of the AND gates 240, 241 in each interval because in the 5 mode or the 6 mode, while it needs to be ensured that as long as an operation button is depressed, the timer 85 be reset at intervals of 104.49 ms or 47.9 ms in order for the operation to be repeated, the command is produced but once from the microcomputer 6 upon depression and the reset signal NCT is not generated in each interval.

OR gate 262: a signal CSTP to stop the counting by the timer 85 upon generation of the coincidence signals EEQ, EQ to stop the operation.

OR gate 263: a signal to set the tracking brake enable signal TBKE.

OR gate 264: a signal to reset the tracking brake enable signal TBKE through an inverter 280.

OR gate 265: a signal to set the tracking servo-off signal TSOF.

OR gate 266: a signal to reset the tracking servo-off signal TSOF through an inverter 281.

OR gate 267: a signal to set the tracking gain high signal TRGH.

OR gate 268: a signal to reset the tracking gain high signal through an inverter 282.

OR gate 269: a signal to set the tracking hold signal TRHD and the kick pulses KP±.

OR gate 270: a signal to set the kick pulses KP± and a signal to reset the kick pulses KP± through an inverter 283.

OR gate 271: a signal to reset the tracking hold signal TRHD and kick pulses KP± through an inverter 284.

OR gate 272: a signal to set the feed servo-off signal FEOF; it is produced in response to the focus-out signal indicating that the light beam is out of focus.

OR gate 273: a signal to set the feed motor drive signal FM±.

OR gate 274: a signal to set the feed servo-off signal FEOF through an inverter 285 and a signal to reset the feed motor drive signal FEM±.

OR gate 275: the new command demand signal NCTE; since the operations are repeated at intervals determined in the respective modes, the signal NCTE checks whether or not a new command (new time difference data in the 7 mode) has been given upon termination of the intervals and if not, NCTE is taken in to switch the control accordingly. In the 7 mode, the signal NCTE is also produced in response to the coincidence detection signal EEQ or EQ. In the 0 to 4 modes, since no intervals are set, the new command demand signal NCTE is produced all the time so that upon a new comamnd being given, it may be taken in the command register.

The tracking brake enable signal TBKE is taken and set in a register 293 through an AND gate 291 and OR gate 292 at the timings of the clocks φA, φB, self-held through AND gates 294 and 292, and reset in response to the reset signal. The other control signals TSOF, TRGH, TRHD, KP+, KP−, FEOF, FEM+, and FEM− are produced respectively from registers 303 to 310 in like manner. The kick pulses KP± are selected in response to the plus or minus signal +, − from said command decoder 84 such that for a command with a plus sign, the kick pulse KP+ is produced first, followed by KP− to apply braking and for a command with a minus sign, the kick pulses are produced in the reverse order. The feed motor drive signals FEM± are selected also according to the sign signal such that for a command with a plus sign, FEM+ is selected and for a command with a minus sign, FEM− is selected. The tracking servo-off signal TSOF is applied to an OR gate 302 together with the logical product obtained from an AND gate 301 of the tracking brake enable signal TBKE and the tracking servo mute signal HFSM to prepare the tracking servo-off signal TROF according to the equation TROF=TSOF+TBKE.HFSM.

Thus are prepared the control signals, i.e., timer reset signal CCLR, timer stop signal CSTP, tracking servo-off signal TROF, tracking gain high signal TRGH, tracking hold signal TRHD, kick pulses KP±, feed servo-off signal FEOF, feed motor drive signal FEM±, and new command demand signal NCTE.

Now a series of operations in the 7 mode will be described.

(1) Upon depression of the PLAY button after selecting the number of the piece to be played, the command ordering the 7 mode is produced from the Din output of the microcomputer 6 (FIG. 3) at the first byte and taken in by the command buffer 81 through the serial-to-parallel conversion circuit 80 (FIG. 4). The target time data corresponding to the piece selected is produced from the Din output of the microcomputer 6 in BCD codes representing minutes, seconds and frames at the respective second to fourth bytes (FIG. 6) and stored in the target time register 11 through the BCD-to-binary conversion circuit 8. At this time, the time data in the Q subcode representing the present time has been stored in the present time register 10, so that the time difference between the target time and the present time is obtained.

(2) Where the present 7 mode was preceded by the 5 or 6 mode, the new command demand signal NCTE should have been produced in each of the preset intervals while where the present 7 mode was preceded by any of the 0 to 4 modes, the new command demand signal NCTE should have been produced all the time. According to this new command demand signal NCTE and the new command receiving signal CAQ, the command register 82 is loaded with the command indicating the 7 mode while the time difference output register 75 is loaded with the time difference data, thereby starting the search operation.

(3) Supposing that the time difference initially is +40 minutes, in FIG. 9 the bits 75-16 (32 min.) and 75-14 (8 min.) of the time difference output register 75 is turned to "1", indicating that the time difference is 40 minutes. Consequently, the NOR gates the NR1 to NR3 provided on the output side of the time difference output register 75 judge that the time difference is not less than two minutes, so that the 7-3 mode control is executed.

(4) More specifically, the AND gate 71 of the command register 84 corresponding to the 7-3 mode is turned on and the AND gates 248 to 251 of the timer decoder 90 are enabled to effect the corresponding control whereby the feed servo-off signal FEOF is set to turn off the feed servo while the feed motor drive signal FEM+ for a positive-direction feed is set in response to the signal indicating "plus" so as to effect the forcible feed. Since the timer 85 was once cleared in response to the signal NCT when the new command was shifted to the command register 21, the time in the timer 85 is that as from the start of the feed operation. In the feed operation, the new command demand signal NCTE is produced in response to the signal delivered at intervals of 34.8 ms from the AND gate 249 of the timer decoder 90 to secure intervals.

(5) In the 7-3 mode, the tracking servo is turned on and off periodically in response to the tracking servo-off signal TSOF. When TSOF is on, it is possible to read the Q subcode. When the Q subcode has been read, new time difference data is prepared based thereon while the signal CAQ is also produced, so that the new time difference data is stored in the time difference output register in response to the shift signal NCTL at the timing of the new command demand signal NCTE produced upon termination of each of the intervals. Although the shift signal NCTL is also applied to the command register, the content of the command register 82 does not change because of the 7-mode command retained in the command buffer.

(6) When the new time difference is shifted, the timer 85 is reset in response to the signal NCT simultaneously to execute the control based on the time difference.

This operation is repeated each time the Q subcode is read so that the time difference grows smaller gradually until it is less than two minutes, whereupon there remains no signal "1" in any bits of the time difference register 75 corresponding to 2 minutes to 64 minutes. As a result, the coincidence detection signal EEQ is produced from the coincidence detection circuit 16. According to this coincidence detection signal EEQ, the count is stopped with the timer 85 cleared. Then the operation mode switches to the 7-2.6 mode or the 7-1.5 mode depending on the judgement made by the NOR gates NR1 to NR3 so that the input to the coincidence detection circuit 16 switches. Accordingly, the coincidence detection signal EEQ is cleared and the stoppage is cleared so that the control in the new mode is started.

(7) Thus the present time approaches the target time as the time difference diminishes to less than 16f, when all the bit signals supplied from the time difference output register 75 to the coincidence detection circuit 16 are all "0" and, therefore, in the event the sign is + (the 7-0 mode), the count 0 in the timer 85 causes the coincidence signal EQ to be produced so as to stop the operation. That is, since the target position can be reached immediately owing to the rotation of the disc, nothing is done. In the event the sign is−(the 7-4 mode), the signal "1" is produced from the AND gate 159 of the time difference decoder 83 and applied, through the OR gate 1, to the exclusive OR gate Ex 1 of the coincidence detection circuit 16. In this case, therefore, the operation lasts 17.4 ms or the time provided by the timer 85 correlated with the exclusive OR gate Ex 1, i.e., for the interval preset for the 7-4 mode and terminates upon generation of the coincidence signal EQ. Therefore, the kick is effected only once.

(8) Upon detecting the arrival at the target time by the time difference data from the time decoder 83, a new command is produced from the microcomputer 6 to rewrite the content of the command register 82 for the operation in a new mode (e.g., the 4-0 play mode) to be started.

In the event the Q subcode could not be read in the search mode, since the timer 85 is not reset, the count increases. When the count reaches the time corresponding to the bit in the 1 state of the time difference output register 75, the coincidence detection signal EEQ is produced from the coincidence detection circuit 16 to clear the operation while the count by the timer 85 stops in response to the timer stop signal CSTP, so that the head stops. Where, for example, the time difference is 40 minutes, the feed operation lasts 1388 ms or the sum of 1.11 seconds given by the second stage 89-2 of the timer register 89 and 278 ms given by the fourth stage 89-4. As mentioned above, since the operation time is the time in which to bring the time difference to about 0, the head can stop near the target position. Since the disc is rotating in the meantime, the Q subcode can be read. Upon reading of the Q subcode, new time difference data is loaded in the time difference output register 75 and the timer 85 is reset so as to start the control based on the new time difference. Thus the target position can be finally reached through said operations (1) to (8).

What is claimed is:

1. A position control device for an optical reproduction system in an optical type disc reproduction device comprising:
    means for rotating an optical disc on which a sequence of information is recorded;
    an optical reproduction system picking up the recorded sequence of data optically from the rotating optical disc;
    a BCD/binary conversion circuit for converting time data of a Q subcode contained in the data picked up by the optical reproduction system from a BCD code into a binary code, said BCD/binary conversion circuit comprising a series/parallel converter for converting serial BCD code time data to parallel data, a BCD/binary converter including means for converting the time data of the Q subcode, structured as frame data according to the rate of 75 frames/sec., into time data structured according to a different rate, and a parallel/series converter for converting parallel binary code time data to serial data; and
    relative position change means for changing a relative position of said optical reproduction system with respect to said optical disc in accordance with the time data of the Q subcode which has been converted into a binary code.

2. A position control device as defined in claim 1 wherein said BCD/binary conversion circuit effects conversion of the Q subcode time data from a BCD code into a binary code structured according to 64 units per one (1) second.

3. A position control device as defined in claim 1 further comprising time difference detection means for detecting time difference data, said time difference detection means being responsive to present time data, which is the time data of the Q subcode converted into the binary code, and target time data, which is used by said relative position change means, the time difference data being the difference between these time data, said relative position change means changing the relative position of the optical reproduction system with respect to the optical disc so as to reduce the time difference data to zero.

4. A position control device as defined in claim 3 further comprising:
    a timer circuit starting counting of time upon detecting the time difference data; and
    means for comparing an output of said time difference detection means with an output of said time circuit and controlling said relative position change means until the output of said timer circuit coincides with a time which is predetermined in accordance with the detected time difference data thereby to move said optical reproduction system so that the time difference data is reduced to zero.

5. A position control device as defined in claim 4 wherein said time difference detection means comprises:
    a target time register holding target time data;
    a present time register holding present time data; and
    a time difference operating circuit performing subtraction between an output of said present time register and an output of said target time register to obtain the time difference.

6. A position control device as defined in claim 5 wherein said time difference detection means includes means for holding time data in said present time register after the optical reproduction system has detected a new Q subcode data in the sequence of data, means for detecting the new time difference data from the time data of the new Q subcode and the target time data held in said target time register, and means for counting of time in said timer circuit upon detecting the time difference data.

7. A position control device for use in an optical disc type reproduction system having a rotating optical disc comprising:
    an optical reproduction pickup head for reading BCD coded digital time data located in a track on the optical disc, the digital time data being represented in units of minutes, seconds, and frames, the value of the time data corresponding to the present position of the pickup head;
    a BCD/binary conversion circuit for converting the BCD coded time data read from the disc from the BCD code to a binary data code and for converting the binary data from a representation of 75 frame units per second to a representation of 64 frame units per second; and
    pickup head position change means for moving the pickup head across the optical disc from a present position toward a target position in accordance with the time value difference between the time value data read from the optical disc and a target time value corresponding to a target position.

8. The position control device of claim 7 wherein the pickup head position change means includes a timer circuit for determining the duration and speed of movement of the pickup head such that the speed and duration of movement are selected from among predetermined values in accordance with the time value difference, where the timer circuit initiates the pickup head movement upon determination of the time value difference and terminates the pickup head movement after a time interval equal to the selected duration.

* * * * *